United States Patent
Mimita et al.

(10) Patent No.: US 10,921,500 B2
(45) Date of Patent: Feb. 16, 2021

(54) OPTICAL ELEMENT, AND OPTICAL ELEMENT-EQUIPPED ARTICLE

(71) Applicant: TOPPAN PRINTING CO., LTD., Tokyo (JP)

(72) Inventors: Naomichi Mimita, Tokyo (JP); Mizuki Yanagimoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 220 days.

(21) Appl. No.: 16/018,275

(22) Filed: Jun. 26, 2018

(65) Prior Publication Data

US 2018/0299596 A1    Oct. 18, 2018

Related U.S. Application Data

(63) Continuation of application No. PCT/JP2017/000300, filed on Jan. 6, 2017.

(30) Foreign Application Priority Data

Jan. 7, 2016   (JP) .................................. 2016-001760

(51) Int. Cl.
*G02B 5/18*    (2006.01)
*B42D 25/328*    (2014.01)
(Continued)

(52) U.S. Cl.
CPC ........... *G02B 5/1847* (2013.01); *B42D 25/21* (2014.10); *B42D 25/324* (2014.10);
(Continued)

(58) Field of Classification Search
CPC ...... G02B 5/1847; G02B 5/18; G02B 5/1861; G02B 1/118; B42D 25/324; B42D 25/21;
(Continued)

(56) References Cited

U.S. PATENT DOCUMENTS

2008/0272883 A1*  11/2008  Toda ..................... B29C 70/546
                                                   340/5.8
2015/0192897 A1    7/2015  Schilling et al.
(Continued)

FOREIGN PATENT DOCUMENTS

DE    10 2012 105 571 A1    1/2014
EP         1855127 A1    11/2007
(Continued)

OTHER PUBLICATIONS

Extended European Search Report dated Dec. 20, 2018 in corresponding application No. 17736029.4.
(Continued)

*Primary Examiner* — Kimberly N. Kakalec
(74) *Attorney, Agent, or Firm* — Foley & Lardner LLP

(57) ABSTRACT

A concavo-convex structure forming layer with a concavo-convex structure on one surface; and a light-reflecting layer on at least part of a surface of the concavo-convex structure. In the optical element, the concavo-convex structure forming layer includes a unit group made up of a plurality of units whose concavo-convex structures are different from each other; each of the units has a flat portion and either a plurality of convexities or a plurality of concavities, with an upper surface of each convexity or a bottom surface of each concavity being substantially parallel to a surface of the flat portion; the convexities or the concavities adjacent to each other have center-to-center distances that are not constant; the convexities or the concavities have a constant height or depth; and in the unit group, units having an identical concavo-convex structure are not arrayed at a pitch of less than 150 μm.

8 Claims, 21 Drawing Sheets

(51) Int. Cl.
*B42D 25/324* (2014.01)
*B42D 25/21* (2014.01)
*B42D 25/351* (2014.01)
*B42D 25/373* (2014.01)

(52) U.S. Cl.
CPC ......... *B42D 25/328* (2014.10); *B42D 25/351* (2014.10); *B42D 25/373* (2014.10); *G02B 5/18* (2013.01)

(58) Field of Classification Search
CPC ... B42D 25/351; B42D 25/373; B42D 25/328
See application file for complete search history.

(56) References Cited

U.S. PATENT DOCUMENTS

| | | | | |
|---|---|---|---|---|
| 2015/0362642 | A1* | 12/2015 | Nagano | G07D 7/1205 283/72 |
| 2018/0229535 | A1* | 8/2018 | Mimita | G09F 19/12 |

FOREIGN PATENT DOCUMENTS

| | | |
|---|---|---|
| EP | 2 077 459 A1 | 7/2009 |
| EP | 2 447 743 A1 | 5/2012 |
| EP | 2 960 690 A1 | 12/2015 |
| EP | 3 367 140 A1 | 8/2018 |
| JP | H04-136810 A | 5/1992 |
| JP | 2006-133625 A | 5/2006 |
| JP | 2010-204348 A | 9/2010 |
| JP | 2011-118035 A | 6/2011 |
| JP | 2011-209376 A | 10/2011 |
| JP | 2011-218648 A | 11/2011 |
| JP | 4983899 B2 | 7/2012 |
| JP | 4983948 B2 | 7/2012 |
| JP | 5143855 B2 | 2/2013 |
| JP | 5570210 B2 | 8/2014 |
| WO | WO-2014/023415 A1 | 2/2014 |

OTHER PUBLICATIONS

International Search Report with English language translation and Written Opinion issued in International Application No. PCT/JP2017/000300 dated Mar. 28, 2017.

Communication of a Notice of Opposition issued in European Patent Application No. 17736029.4 dated Dec. 10, 2020.

Japanese Office Action issued in Japanese Application No. 2017-560436 dated Dec. 15, 2020, with English Translation.

* cited by examiner

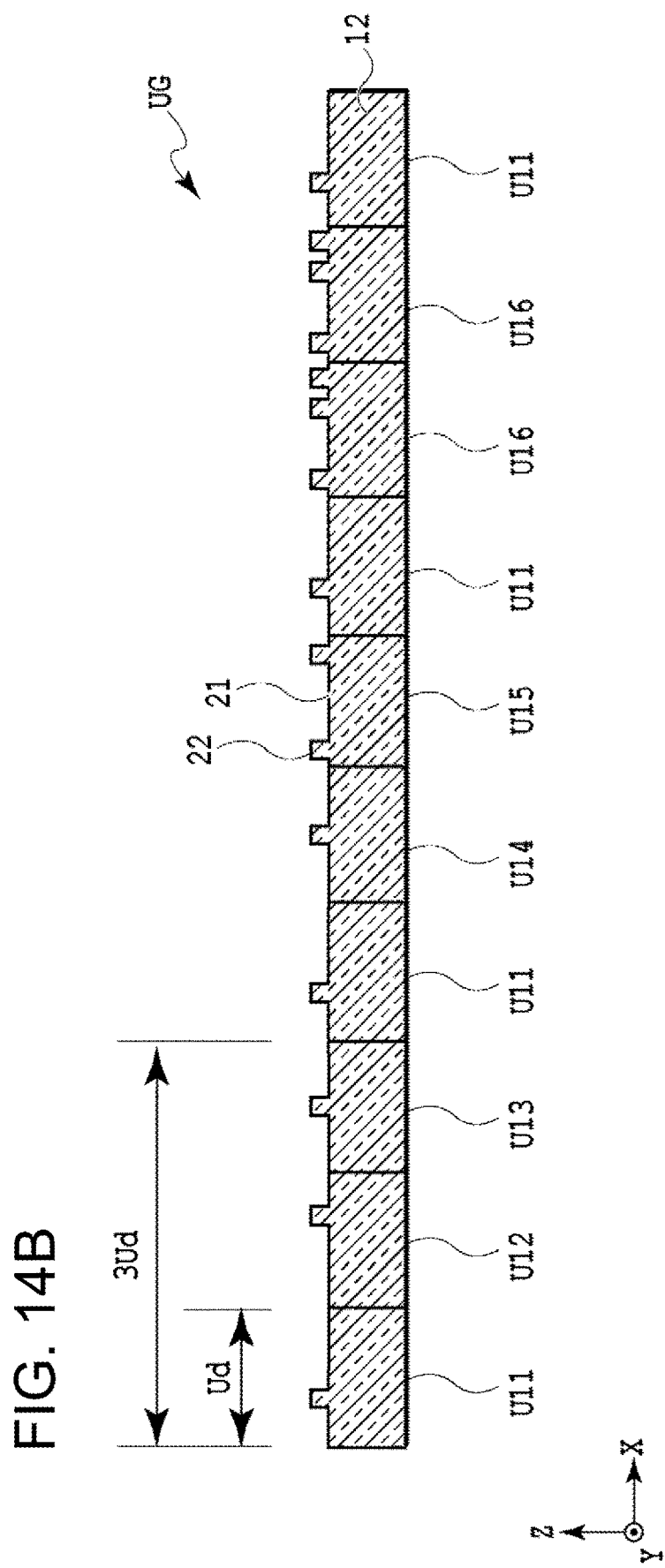

OPTICAL ELEMENT, AND OPTICAL ELEMENT-EQUIPPED ARTICLE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2017/000300, filed on Jan. 6, 2017, which is based upon and claims the benefit of priority to Japanese Patent Application No. 2016-001760, filed on Jan. 7, 2016, the disclosures of which are all hereby incorporated herein by reference in their entireties.

TECHNICAL FIELD

The present invention relates to an optical element that provides anticounterfeit effects, decorative effects, and aesthetic effects, and in particular to an optical element that provides anticounterfeit effects applicable, for example, to security devices for use in valuable papers such as banknotes, IDs such as passports, and brand protection.

BACKGROUND OF THE INVENTION

Valuable papers such as coupons and checks, cards such as credit cards, cash cards, and ID cards, and certificates such as passports and license certificates generally have an optical element adhered thereto to prevent these articles from being counterfeited. Such optical elements have visual effects that are different from those of normal printed matter. In recent years, counterfeit products are also rampant in fields other than the field of valuable papers or certificates, and becoming a social problem. Therefore, anticounterfeit techniques are increasingly applied to articles in a manner and fields similar to those mentioned above.

For example, optical elements provided with a diffraction grating (PTL 1) are known as optical elements having visual effects different from those of normal printed objects. With such an optical element, the wavelength of diffracted light reaching the observer's eyes changes depending on the angle of observation. Accordingly, the observer recognizes iridescent changes in the optical element.

Techniques of producing such diffraction grating optical elements have become widespread. Therefore, fake optical elements that look similar to genuine ones at first glance, though not exactly identical, have been produced, making the anticounterfeit effects less useful.

PTLs 2 to 5 suggest optical elements having optical effects different from those of the diffraction-grated optical elements. Specifically, the optical elements suggested in these documents each display colors with little observation-angle-dependent chromatic change but achieve high chroma level.

CITATION LIST

[PTL 1] JP H04-136810 A; [PTL 2] JP 4983899 B2; [PTL 3] JP 4983948 B2; [PTL 4] JP 5143855 B2; [PTL 5] JP 5570210 B2;

SUMMARY OF THE INVENTION

Technical Problem

It is important that the optical elements displaying colors of high chroma level have a concavo-convex structure for chromatic display in which convexities (or concavities) are not arrayed at regular intervals, to make the observation-angle-dependent chromatic change small. For this reason, attempts have been made to arrange convexities (or concavities) such that the center-to-center distances of adjacent convexities (or concavities) are random. It is, however, very difficult to completely randomize the center-to-center distances of adjacent convexities (or concavities) throughout the concavo-convex structure. For example, computer-based arrangement of convexities causes a problem of increasing the load imposed on the data generation system. Even if adjacent convexities have random center-to-center distances, convexities may be accidentally distributed at regular intervals in isolated spots. Such a distribution of convexities may result in observation-angle-dependent chromatic change.

It is thus necessary to find a structure that reduces load of data generation and reduces observation-angle-dependent chromatic change as much as possible.

The present invention aims to provide an optical element for displaying colors of high chroma level (termed structural color(s) hereinafter), with a structure that reduces data generation load and with little observation-angle-dependent chromatic change.

Proposed Solution to Problem

The optical element of the present invention includes a concavo-convex structure forming layer that has a concavo-convex structure on one surface; and a light-reflecting layer that covers at least part of a surface of the concavo-convex structure of the concavo-convex structure forming layer. In the optical element, the concavo-convex structure forming layer includes a unit group made up of a plurality of units whose concavo-convex structures are different from each other; each of the units has a flat portion and either a plurality of convexities or a plurality of concavities, with an upper surface of each convexity or a bottom surface of each concavity being substantially parallel to a surface of the flat portion; the convexities or the concavities adjacent to each other have center-to-center distances that are not constant; the convexities or the concavities have a constant height or depth; and in the unit group, units having an identical concavo-convex structure are not arrayed at a pitch of less than 150 μm.

An optical element-equipped article of the present invention is characterized in that the article includes the optical element of the present invention and an article that supports the optical element.

Advantageous Effects of the Invention

An optical element and an optical element-equipped article of the present invention have a structure that is capable of reducing data generation load, and attempts to display colors with minimal observation-angle-dependent chromatic change and at high chroma level.

BRIEF DESCRIPTION OF THE DRAWINGS

FIG. 14B is a cross-sectional view taken along the line XIVB-XIVB of FIG. 14A.

DESCRIPTION OF THE REPRESENTATIVE EMBODIMENTS

Figure 1A:
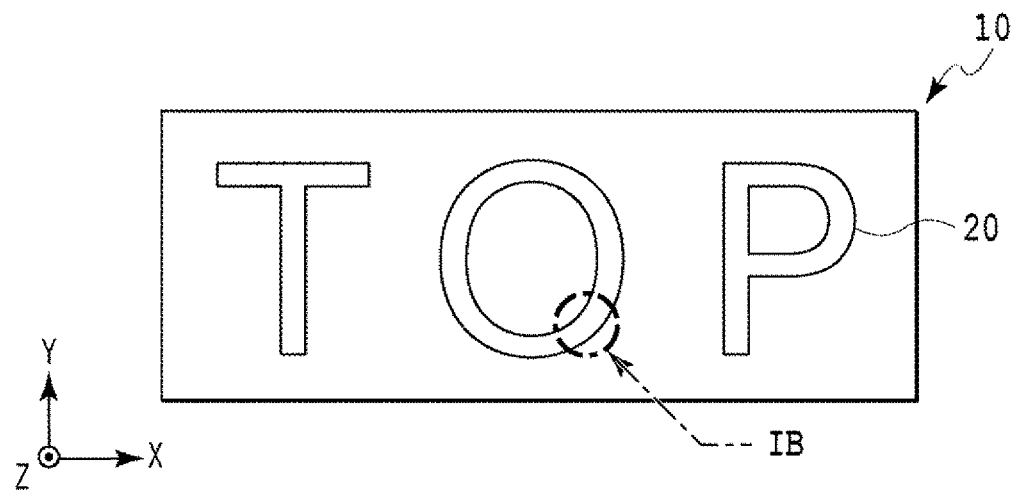
FIG. 1A is a schematic plan view illustrating an example of an optical element according to the present invention.

Some representative embodiments of the present invention will be described in detail. In the following description, reference will be made to the drawings as appropriate, but modes illustrated in the drawings are only representative examples of the present invention. The present invention should not be limited to these modes. In the drawings, components having identical or similar functions are given the same reference signs and duplicate description may be omitted.

Furthermore, the scale ratio in the drawings is exaggerated for convenience of description and may differ from the actual ratio. Further, in the present specification, the mark "-" means that the lower limit and the upper limit before and after the mark are included in the indicated range.

<Optical Element>

An optical element according to the present invention includes a concavo-convex structure forming layer having a concavo-convex structure on a surface thereof and a light-reflecting layer covering at least part of the surface of the concavo-convex structure of the concavo-convex structure forming layer.

Figure 1B:
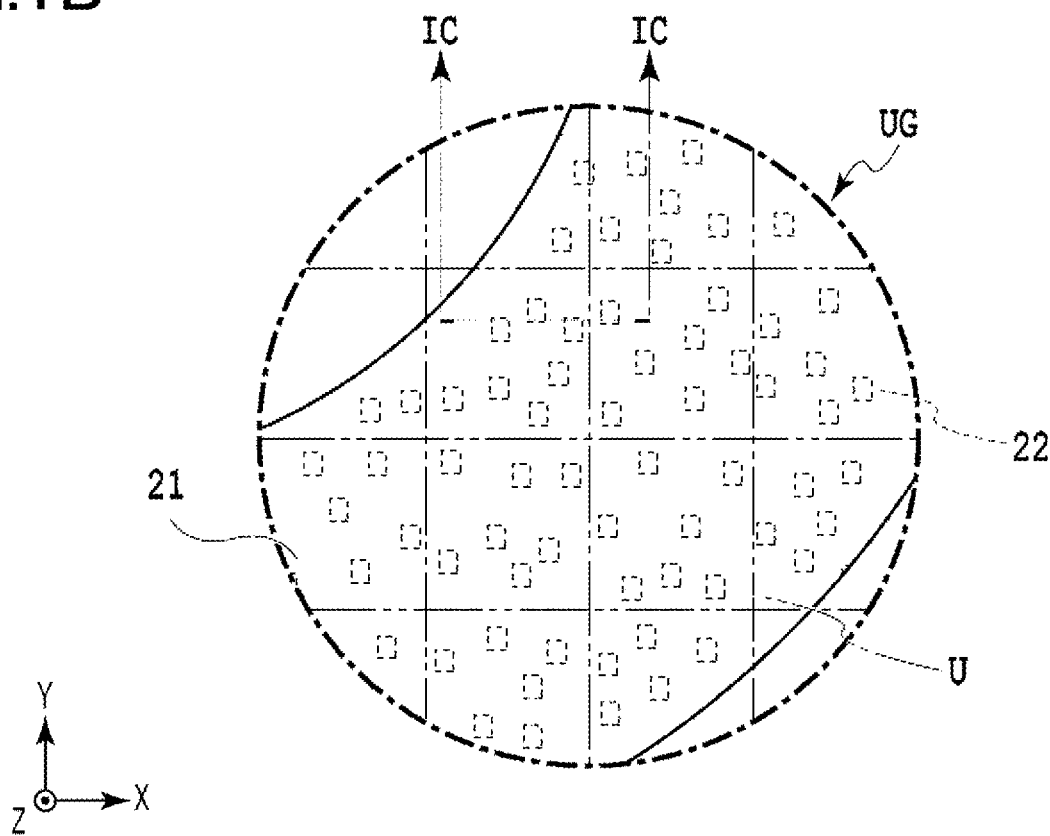
FIG. 1B is an enlarged view of the portion circled by the dash-dot line of FIG. 1A.
Figure 1C:
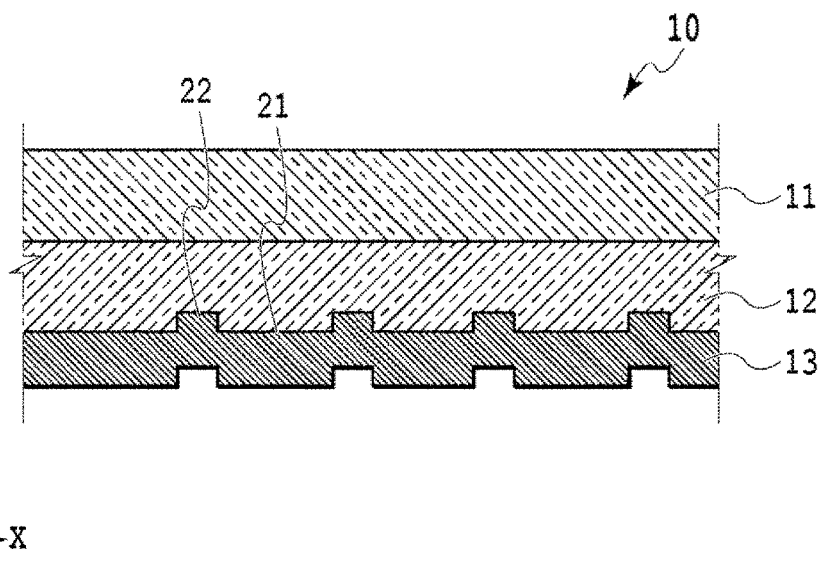
FIG. 1C is a cross-sectional view taken along the line IC-IC of FIG. 1B.

FIG. 1A is a schematic plan view illustrating an example of an optical element according to the present invention. FIG. 1B is an enlarged view of the portion circled by the dash-dot line of FIG. 1A. FIG. 1C is a cross-sectional view taken along the line IC-IC of FIG. 1B. In FIGS. 1A and 1B, the X and Y directions are parallel to the display surface and perpendicular to each other. Also, the Z direction is perpendicular to the X and Y directions.

As shown in FIG. 1B, the optical element according to the present invention includes a unit group UG, where a plurality of units U are arrayed, on a surface of a concavo-convex structure forming layer. Each unit U has a concavo-convex structure including a flat portion 21 and convexities 22 (or concavities). In the present invention, the concavo-convex structure forming layer may be provided with concavities instead of the convexities 22. Convexities or concavities are defined with reference to the surface where they are formed. Recesses formed on the surface serve as concavities, and protrusions formed on the surface serve as the convexities 22.

The optical element in the example shown in FIG. 1C includes an optically transparent substrate 11, a concavo-convex structure forming layer 12 having a concave structure on the surface on a side opposite to the optically transparent substrate 11, and a light-reflecting layer 13 covering the surface of the concave structure of the concavo-convex structure forming layer 12. Components of the optical element will be described below.

(Optically Transparent Substrate 11)

The optically transparent substrate 11 is typically transparent and, in particular, is clear and transparent. The optically transparent substrate 11 may be omitted in the optical element of the present invention.

Materials that can be used for the optically transparent substrate 11 include, for example, films or sheets formed of a resin, such as polyethylene terephthalate (PET), polyethylene naphthalate (PEN), polycarbonate (PC), triacetylcellulose (TAC), and acrylic. Materials used for the optically transparent substrate 11, however, are not limited to these materials but any material or shape may be selected according to the usage of the optically transparent substrate 11.

The optically transparent substrate 11 may be treated according to the purpose of use. Such treatment may be easy adhesion treatment, antifouling treatment, antistatic treatment, anti-abrasion treatment, release treatment, or the like.

(Concavo-Convex Structure Forming Layer 12)

The concavo-convex structure forming layer 12 is typically formed of an optically transparent resin layer. The concavo-convex structure forming layer 12 includes a unit group UG made up of a plurality of units U as regions where the concavo-convex structure is defined. Each unit U has a specific concavo-convex structure, and this concavo-convex structure includes a flat portion 21 and a plurality of convexities 22 or concavities.

The concavo-convex structure forming layer 12 may include structure regions different from those of the unit group UG. The structures in these regions is not particularly limited as long as the structures are different from that of the unit group UG. Examples of the structures in these regions include diffraction grating structures, hologram structures, scattering structures, cross-grating structures, moth-eye structures, various lens structures, and/or flat structures. These structures may each be provided in regions adjacent to or distant from the concavo-convex structure of the unit group UG.

The structure of the unit group UG will be specifically described later.

Materials that can be used for the concavo-convex structure forming layer 12 include, for example, a thermoplastic resin, a thermosetting resin, a radiation-curable resin, and the like.

Examples of the thermoplastic resin include an acrylic resin, an epoxy resin, a cellulose resin, a vinyl resin, and a mixture of these resins.

Materials that can be used for the thermosetting resin include, for example, a urethane resin obtained by crosslinking a polyol resin such as acrylic polyol resin or a polyester polyol resin with an isocyanate compound, a melamine resin, an epoxy resin, a phenolic resin, a mixture of these resins, and the like.

Materials that can be used for the radiation-curable resin include, for example, monomers such as neopentyl glycol acrylate, trimethylolpropane triacrylate, pentaerythritol acrylate, pentaerythritol tetraacrylate, pentaerythritol pentaacrylate, and pentaerythritol hexaacrylate, oligomers such as epoxy acrylate, urethane acrylate, and polyester acrylate, and polymers such as urethane modified acrylic resin, and epoxy-modified acrylic resin, which are radically polymerizable, and include monomers, oligomers, and polymers, which have a cationically polymerizable epoxy group, Oxetane skeleton-containing compounds, vinyl ethers, and the like.

If a radiation-curable resin is used, various photoinitiators may be combined with the resin.

The concavo-convex structure forming layer 12 may be made of the same material as that of the optically transparent substrate 11.

(Light-Reflecting Layer 13)

The light-reflecting layer 13 at least partially covers a surface of the concavo-convex structure forming layer 12, where the concavo-convex structure is provided. The light-reflecting layer 13 may cover the concavo-convex structure forming layer 12 in conformity with the concavo-convex structure thereof, with the thickness being substantially uniform. In this case, the surface of the light-reflecting layer 13 on a side opposite to the surface contacting the concavo-convex structure forming layer 12 will have a configuration similar to the concavo-convex structure of the concavo-convex structure forming layer 12.

Alternatively, the light-reflecting layer 13 may be provided such that the surface of the light-reflecting layer 13 on a side opposite to the surface contacting the concavo-convex structure forming layer 12 is flattened. In this case, the thickness of the light-reflecting layer 13 will not be uniform.

For example, the light-reflecting layer 13 may be a metal layer made of a metallic material such as aluminum, silver, gold, copper, chromium, or an alloy thereof. Alternatively, the light-reflecting layer 13 may be a dielectric layer having a refractive index different from that of the concavo-convex structure forming layer 12. Alternatively, the light-reflecting layer 13 may be a laminate of dielectric layers, i.e., a dielectric multilayer film, with the refractive index being different between adjacent dielectric layers. If a dielectric multilayer film is used, the refractive index of the dielectric layer contacting the concavo-convex structure forming layer 12 is preferably different from that of the concavo-convex structure forming layer 12.

(Other Layers)

An optical element 10 of the present invention may further include other layers such as a release layer, an adhesive layer, a resin layer, and a printed layer.

The release layer exerts its effects when provided between the optically transparent substrate 11 and the concavo-convex structure forming layer 12, and when the optical element is used as a transfer foil.

Examples of the material for the release layer include an acrylic resin, an epoxy resin, a melamine resin, a polyester resin, a polyvinyl chloride-vinyl acetate copolymer resin, a cellulose resin such as triacetylcellulose (TAC), and mixtures thereof.

The release layer may contain natural wax such as carnauba wax, paraffin wax and montan wax, synthetic wax such as polyethylene wax, or metallic soap, or a fluorine or silicone additive or particles thereof.

The adhesive layer may be provided, for example, covering the light-reflecting layer 13. Provision of the adhesive layer can prevent the surface of the light-reflecting layer 13 from being exposed, making it difficult to duplicate the concavo-convex configuration for counterfeit purposes.

Examples of the material for the adhesive layer include an acrylic resin, a polyester resin, a polyamide resin, a polyvinyl chloride-vinyl acetate copolymer, an ethylene-vinyl acetate copolymer, an ethylene-acrylic copolymer, chlorinated polypropylene, and mixtures thereof.

The adhesive layer may contain fillers such as silica, barium sulfate, and talc.

Examples of the resin layer include a hard coat layer for preventing scratches on the surface of the optical element 10, an anti-reflecting layer for preventing light from reflecting on the surface of the optically transparent substrate 11, an antistatic layer, and an intermediate layer for improving adhesion between different materials. The resin layer can be provided either on the surface of the optically transparent substrate 11 or between any layers of the optical element 10.

The printed layer is provided to display an image such as of a character, a pattern, or a symbol. The printed layer may be provided to the surface of the optically transparent substrate 11 on a side opposite to the surface where the concavo-convex structure forming layer 12 is provided, or may be provided between the concavo-convex structure forming layer 12 and the light-reflecting layer 13, or may be provided on the rear surface of the light-reflecting layer 13.

Various inks, such as offset ink, letterpress ink, gravure ink, flexographic ink, and screen ink, may be used for the printed layer. These inks are used depending on the printing method. These inks can be classified into resin-based inks, oil-based inks, water-based inks, etc. according to the compositions, or into oxidative polymerization inks, penetrative drying inks, evaporative drying inks, ultraviolet curable inks, etc. according to the drying methods, and selected as appropriate depending on the type or the printing method of the optically transparent substrate 11.

Other than normally used color inks, a special ink such as a light-emitting (e.g., fluorescent light-emitting) ink, a cholesteric liquid crystal ink, or a pearl ink may be selected as a material for the printed layer.

(Concavo-Convex Structure of Unit U of Concavo-Convex Structure Forming Layer 12)

The following description addresses the concavo-convex structure of the unit U of the concavo-convex structure forming layer 12.

The concavo-convex structure of the unit U is the basis of the concavo-convex structure of a unit group. In the description of the concavo-convex structure below, matters related to the convexities 22 may be read as matters associated with concavities.

Figure 2:
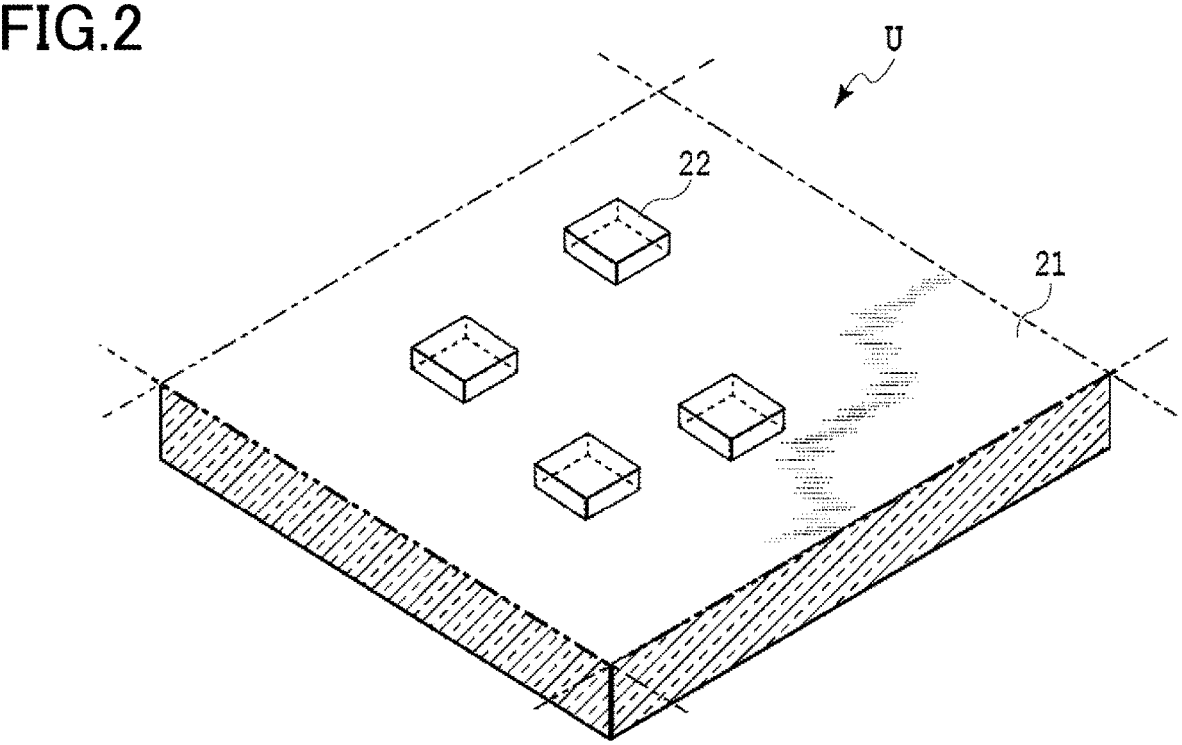
FIG. 2 is a schematic perspective view illustrating an example of a concavo-convex structure in a unit.
Figure 3:
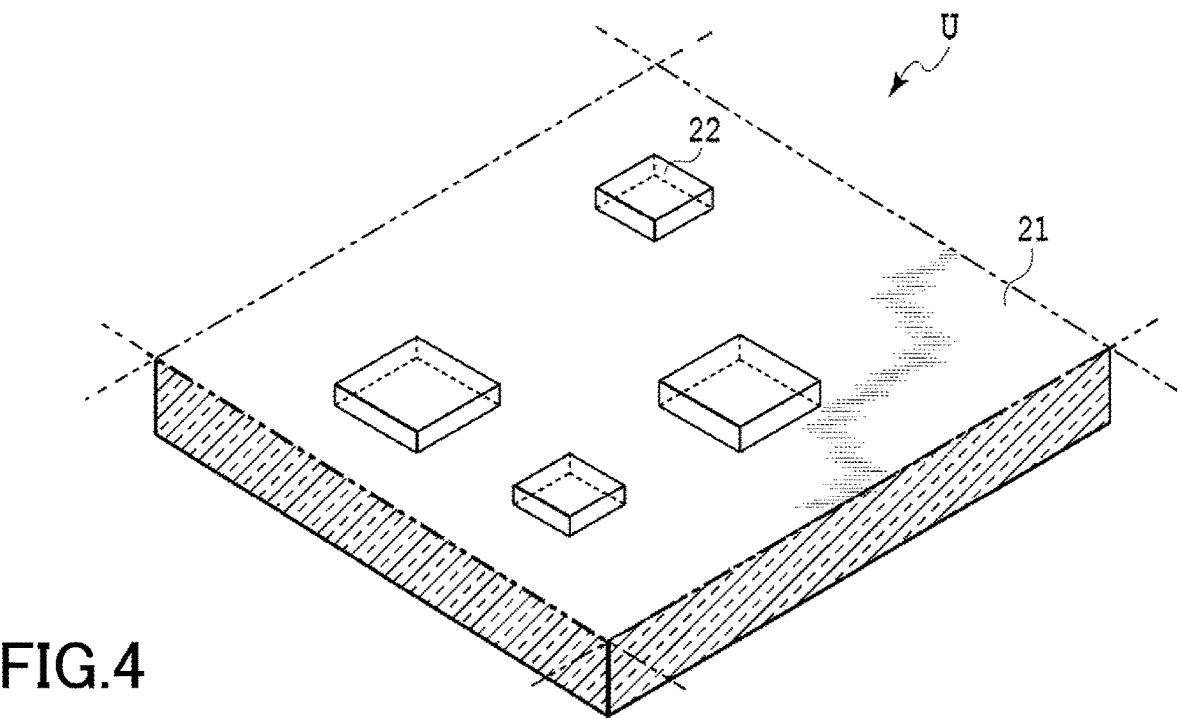
FIG. 3 is a schematic perspective view illustrating another example of a concavo-convex structure in a unit.

FIG. 2 is a schematic perspective view illustrating an example of a concavo-convex structure of the unit U of the concavo-convex structure forming layer 12. As shown in FIG. 2, the unit U has a concavo-convex structure that includes the flat portion 21 and the convexities 22. In the example shown in FIG. 2, each convexity 22 has a square upper surface in plan view; however, the upper surface may have any shape without being limited to such a square shape. For example, the upper surface may be in the shape of a triangle, a quadrilateral such as a rectangle or trapezoid, a polygon such as a pentagon or hexagon, a circle, an ellipse, a star, a cross, or an L shape. Different shapes may be mixed in the unit U. As shown in FIG. 3, the shapes of the upper surfaces of the convexities 22 may be similar but with different sizes. Furthermore, adjacent convexities 22 may partially overlap.

The upper surface of the convexity 22 can be in any shape as mentioned above, but, in particular, may preferably be rectangular or square in terms of ease of manufacture.

There are four convexities 22 in the example shown in FIG. 2, but any number of convexities 22 may be provided as long as the number is two or more.

The long sides and the short sides of the upper surfaces of the convexities 22 may have an average length (simply termed average length of the convexities hereinafter), for example, of 0.3 μm-10 μm, more preferably 0.3 μm-5 μm. The long side and the short side are defined as follows. Of the line segments connecting between two points on the outline of the upper surface of each convexity 22, the longest one is defined as the long side. Then, a rectangle is drawn circumscribing the outline of the upper surface of the convexity 22 so as to have a side parallel to the long side, and each short side of the rectangle is defined as the short side of the upper surface of the convexity 22. If the upper surface of the convexity 22 has a square shape with sides of equal length and corners of equal internal angle, the long side and the short side should have an equal length.

The center-to-center distances of adjacent convexities 22 are preferably not constant (i.e., random), and their average may desirably be in the range of 1.0 μm-3.0 μm. Each center-to-center distance between adjacent convexities 22 refers to the length between the centers or the gravity centers of the upper surfaces of the adjacent convexities 22 concerned.

The upper surface of each convexity 22 is substantially parallel to the surface of the flat portion 21. The upper surface of the convexity 22 and the surface of the flat portion 21 are typically smooth.

The convexities 22 of the unit U can be arranged as desired as long as adjacent convexities 22 are arranged at random center-to-center distances.

The following description addresses a non-directional unit in which a plurality of convexities 22 are randomly arranged.

Figure 4:
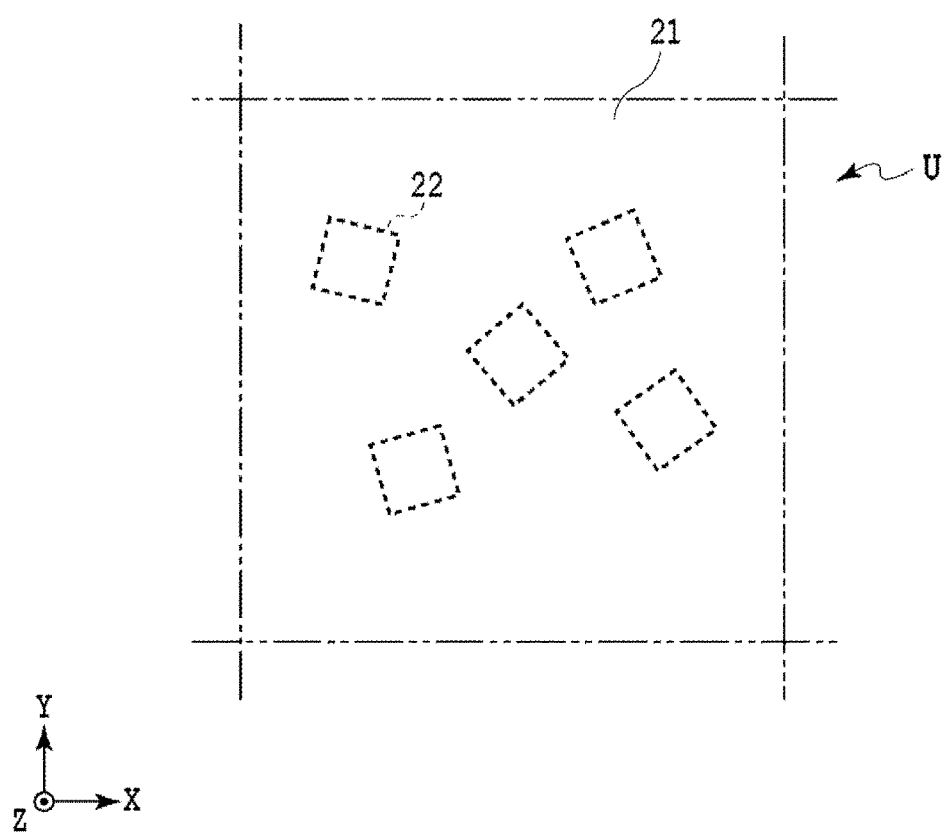
FIG. 4 is a schematic plan view illustrating another example of a concavo-convex structure in a unit.

FIG. 4 is a schematic plan view illustrating an example of a non-directional unit in which a plurality of convexities 22 are randomly arranged. In the example shown in the figure, each convexity 22 has a square upper surface. The sides of the square upper surface have directionality that is not constant between the convexities 22. Thus, in the non-directional unit, directionality of the sides of the square upper surface is not constant between the convexities 22.

Figure 5:
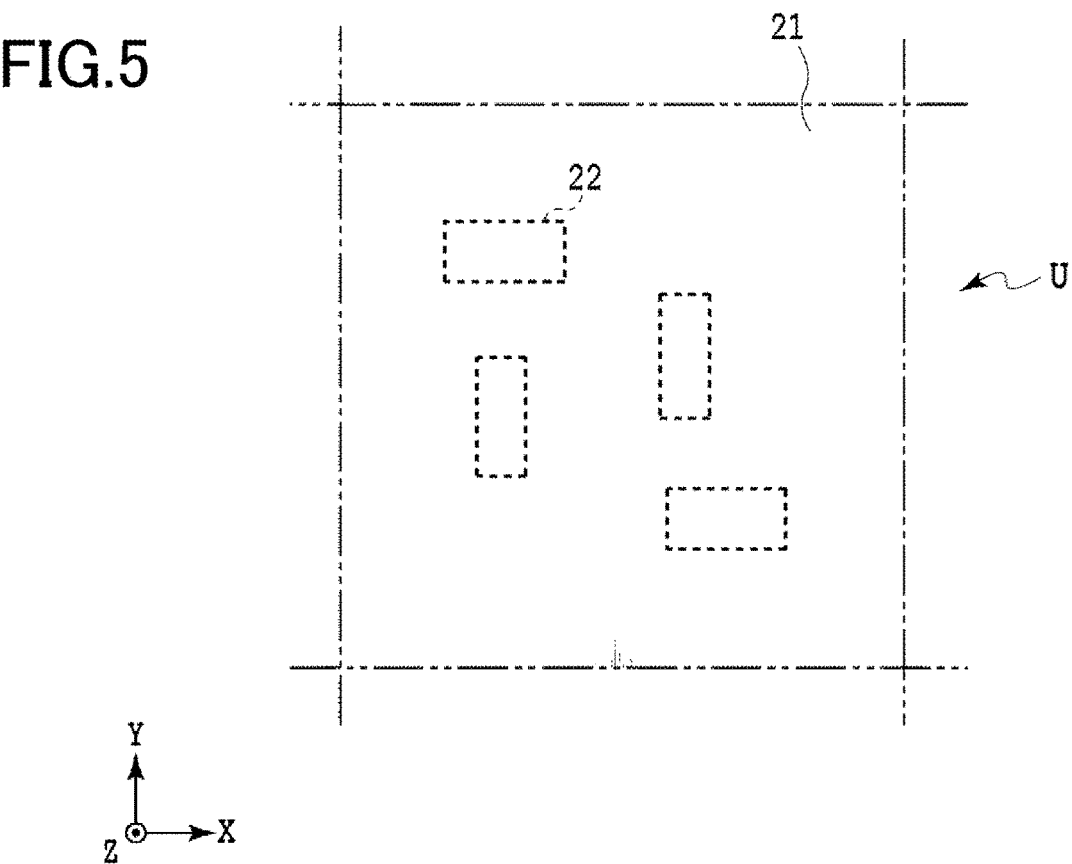
FIG. 5 is a schematic plan view illustrating another example of a concavo-convex structure in a unit.

FIG. 5 is a schematic plan view illustrating another example of a non-directional unit in which a plurality of convexities 22 are randomly arranged. In the figure, each convexity has a rectangular upper surface, and the long sides and the short sides of the surface have directionality that is not constant between the convexities 22. In FIG. 5, each convexity 22 is arranged so that the long sides and the short sides are parallel to the X or Y direction. However, the configuration is not limited to this. The convexities 22 may be arranged with the long sides and the short sides being oriented in a desired direction.

The following description addresses a directional unit in which a plurality of convexities 22 are arranged in a specific direction.

Figure 6:
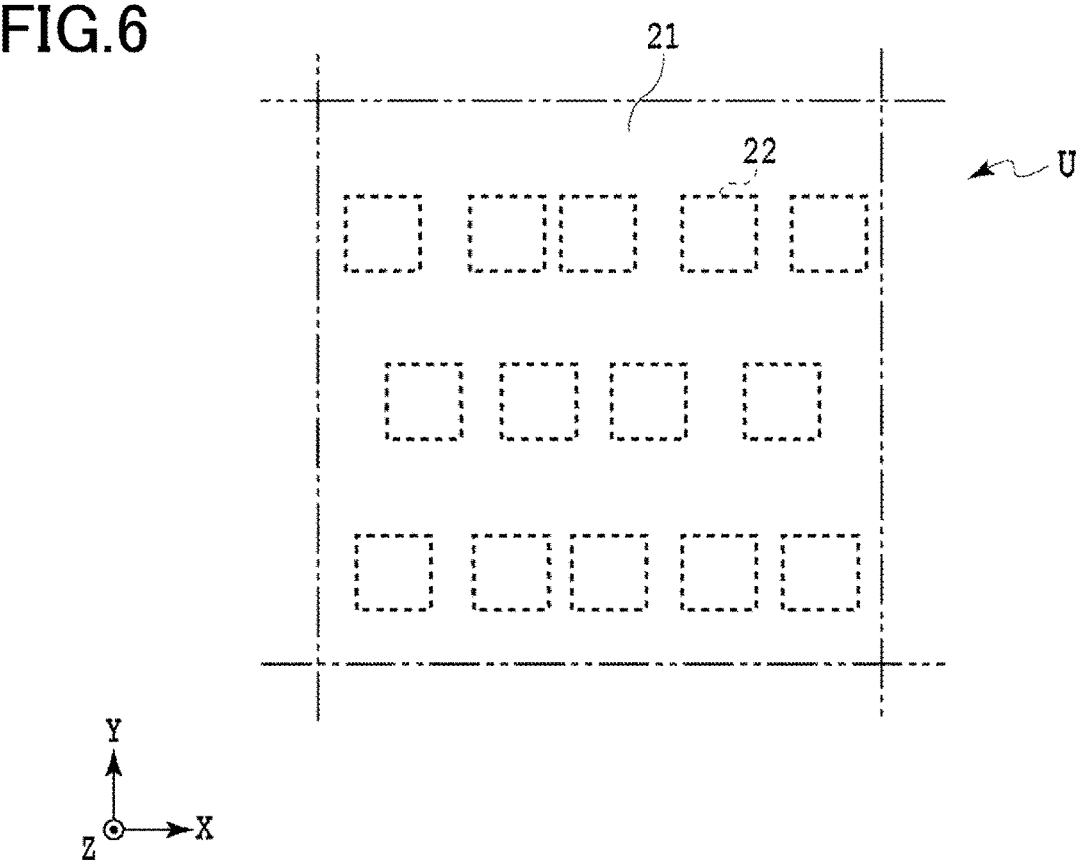
FIG. 6 is a schematic plan view illustrating another example of a concavo-convex structure in a unit.

FIG. 6 is a schematic plan view illustrating an example of a directional unit in which a plurality of convexities 22 are arranged in a specific direction. In the example shown in the figure, each convexity 22 has a square upper surface. The sides of the square upper surface have directionality that is constant between the convexities 22. The term specific direction refers to an arbitrary direction predetermined in the XY plane. Thus, in the directional unit, directionality of the sides of the square upper surface is constant between the convexities 22.

Figure 7:
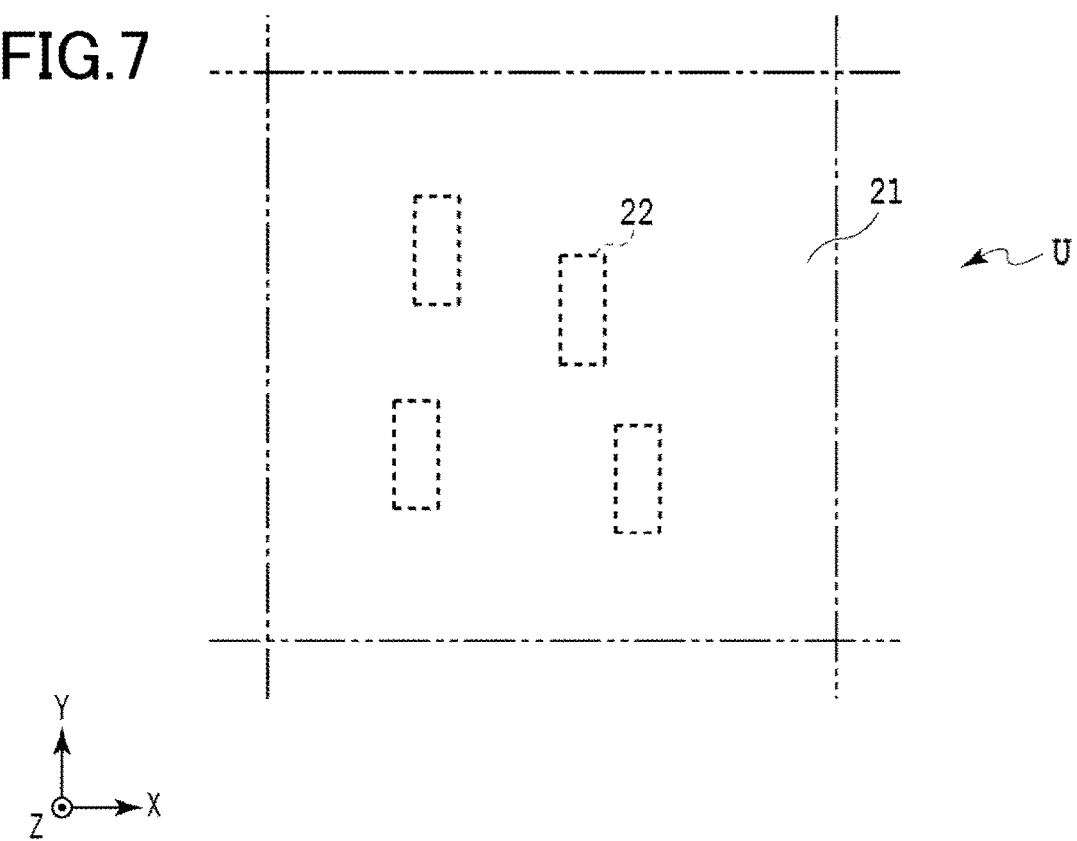
FIG. 7 is a schematic plan view illustrating another example of a concavo-convex structure in a unit.

FIG. 7 is a schematic plan view illustrating another example of a directional unit in which a plurality of convexities 22 are arranged in a specific direction. In the figure, each convexity 22 has a rectangular upper surface, and the long sides and the short sides of the surface have directionality that is constant between the convexities 22. Specifically, the long sides and the short sides of each convexity 22 are respectively parallel to the Y and X directions.

Since a plurality of convexities 22 are arrayed in a specific direction in the directional unit, the scattering directions of light can be controlled. This of arrangement method can change hues of the unit between when observed in the direction of arraying the convexities and when observed in the direction perpendicular to the arrayed direction.

Figure 8:
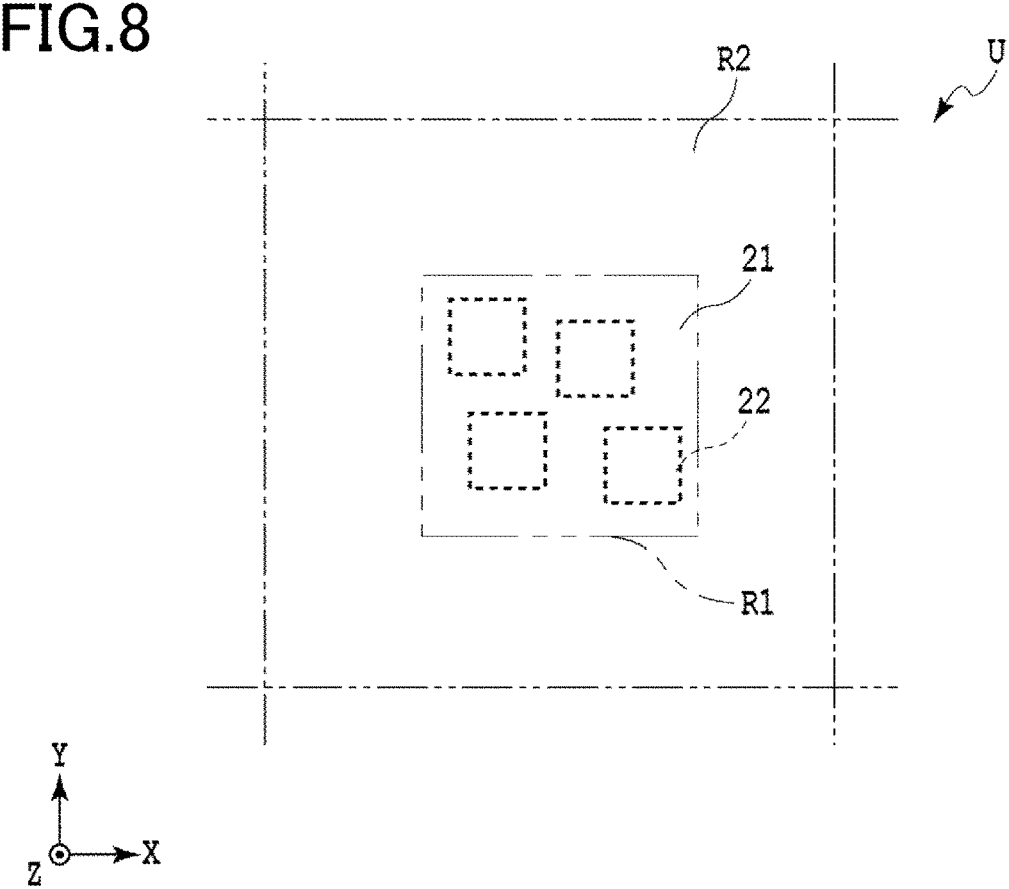
FIG. 8 is a schematic plan view illustrating another example of a concavo-convex structure in a unit.

The convexities 22 are not required to be arranged all over the unit U. As shown in FIG. 8, for example, the unit U may include a concavo-convex structure forming part R1 and a concavo-convex structure non-forming part R2. One unit U may include two or more concavo-convex structure forming parts R1.

The convexities 22 or the concavities of the unit U have a uniform height or depth with reference to the surface of the flat portion. The height or depth is preferably in the range of 0.05 μm-0.5 μm, and more preferably 0.07-0.4 μm. An excessively small height (or depth) may reduce light interference in a specific wavelength region, and thus the structural color is unlikely to be displayed. The light interference herein is in conformity with the height (or depth) defined by the convexities 22 (or concavities) and the flat portion 21. Also, external factors during manufacture, such as a change in the state and environment of the manufacturing apparatus, and a slight change in the material compositions, may greatly affect the optical properties of the concavo-convex structure.

An excessively large height of the convexities 22 (or depth of the concavities) may cause excessive change in the wavelength of interfering light and may make chromatic change greater, depending on the change in observation angle or direction, and thus the structural color may not be easily recognized. The interfering light herein is in conformity with the height (or depth) defined by the convexities 22 (or concavities) and the flat portion 21. It will also be difficult to form the concavo-convex structure with high accuracy in configuration and dimension.

Unless the height of the convexities 22 (or the depth of the concavities) is uniform with reference to the surface of the flat portion 21 of the unit U, interference may occur with light of any wavelength in the visible region. If this is the case, light having various wavelengths evenly reaches the observer's eyes, preventing the observer from perceiving particular colors corresponding to the height of the convexities 22 (or depth of the concavities). Accordingly, the observer only perceives the light as being white.

The side surfaces of each convexity 22 (or each concavity) are substantially perpendicular to the upper surface of the convexity 22 (or the bottom surface of the concavity).

In the concavo-convex structure forming part R1 of the unit U, the upper surfaces of the convexities 22 or the bottom surfaces of the concavities have an area occupancy in the range, for example, of 20%-80%, and more preferably 40%-60%. The area for displaying the structural color is maximized when the ratio of the upper surface area of the convexities 22 or the bottom surface area of the concavities to the flat portion area is 1:1. Therefore, brightest structural color is displayed when the convexities 22 or the concavities have an area occupancy of approximately 50%. With the area occupancy being in the range of 20%-80%, sufficiently bright display is achieved.

(Concavo-Convex Structure of Unit Group UG of Concavo-Convex Structure Forming Layer 12)

The following description addresses a concavo-convex structure of the unit group UG of the concavo-convex structure forming layer 12.

The unit group UG of the concavo-convex structure forming layer 12 has a concavo-convex structure which is constituted by arraying a plurality of units each having the concavo-convex structure as described above. The unit group UG is made up of units having concavo-convex structures different from each other, but may include units having an identical concavo-convex structure. The term units having concavo-convex structures different from each other refers to units each having the convexities 22 arranged differently from other units. The term units having an identical concavo-convex structure refers to units having identically arranged convexities 22.

The optical element having such a concavo-convex structure develops a color (structural color) resulting from interfering light which is attributed to the height that is the surface level difference between the convexities 22 and the flat portion 21, although such an element does not generate diffracted light that would be attributed to a periodic structure.

Referring to FIGS. 9 to 13, first, description will be given of a concavo-convex structure of a unit group UG including units whose concavo-convex structures are different from each other.

Figure 9:
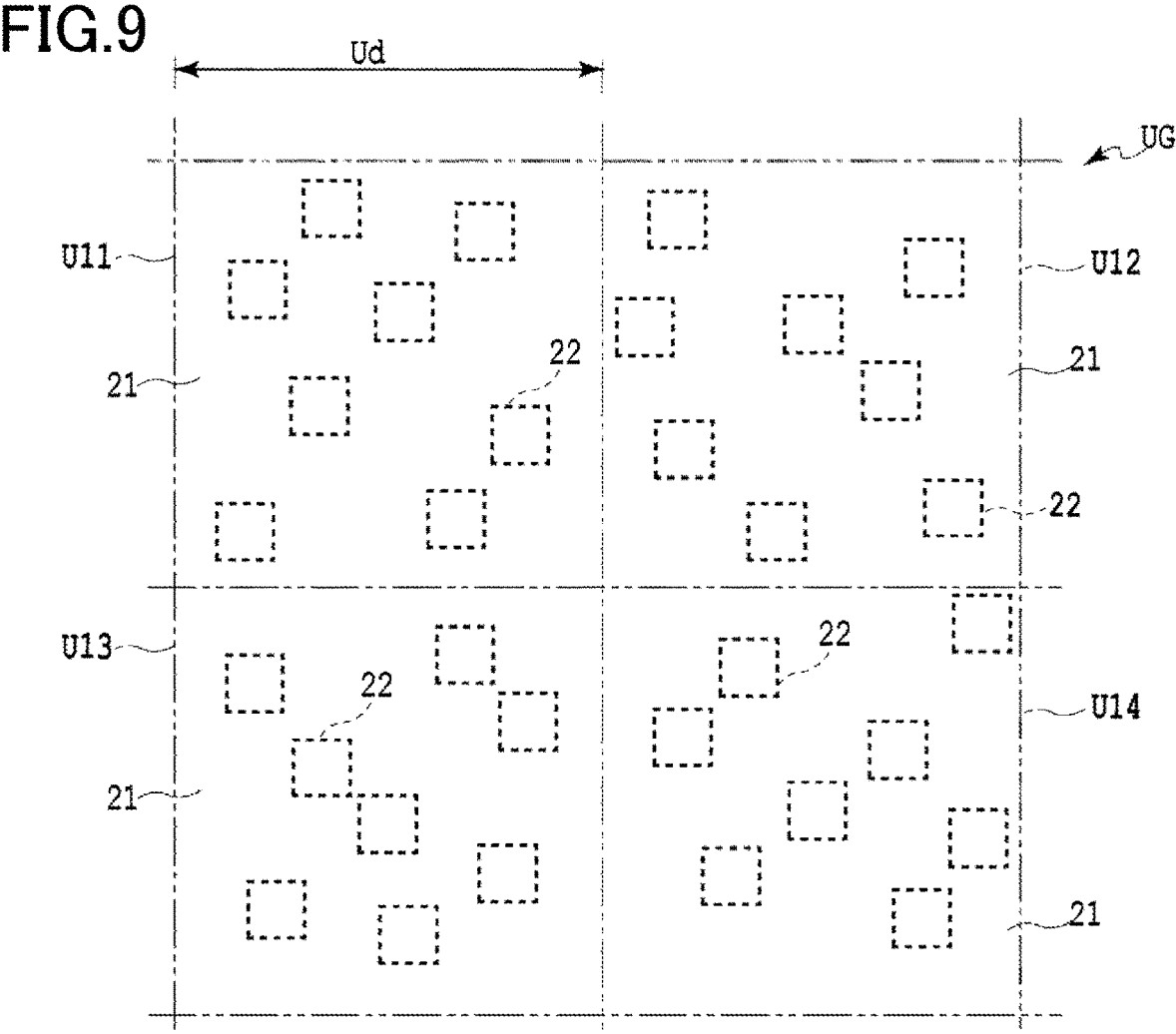
FIG. 9 is a schematic plan view illustrating an example of a concavo-convex structure in a unit group.

FIG. 9 is a plan view of an example of a concavo-convex structure of a unit group UG. Units U11-U14 constituting the unit group UG each include the convexities 22 arranged differently from other units. The units U11-U14 all have a square outer shape and are arrayed at a pitch Ud to form the unit group UG. The unit pitch Ud herein is preferably in the range of 10 μm-500 μm, and more preferably 30 μm-100 μm. A unit pitch Ud of 10 μm or more reduces accidental arraying of the convexities at a constant pitch in the concavo-convex structure. A unit pitch Ud of 500 μm or less reduces data generation load. Such a preferred range of the unit pitch Ud applies to any of unit arrays described below.

Figure 10:
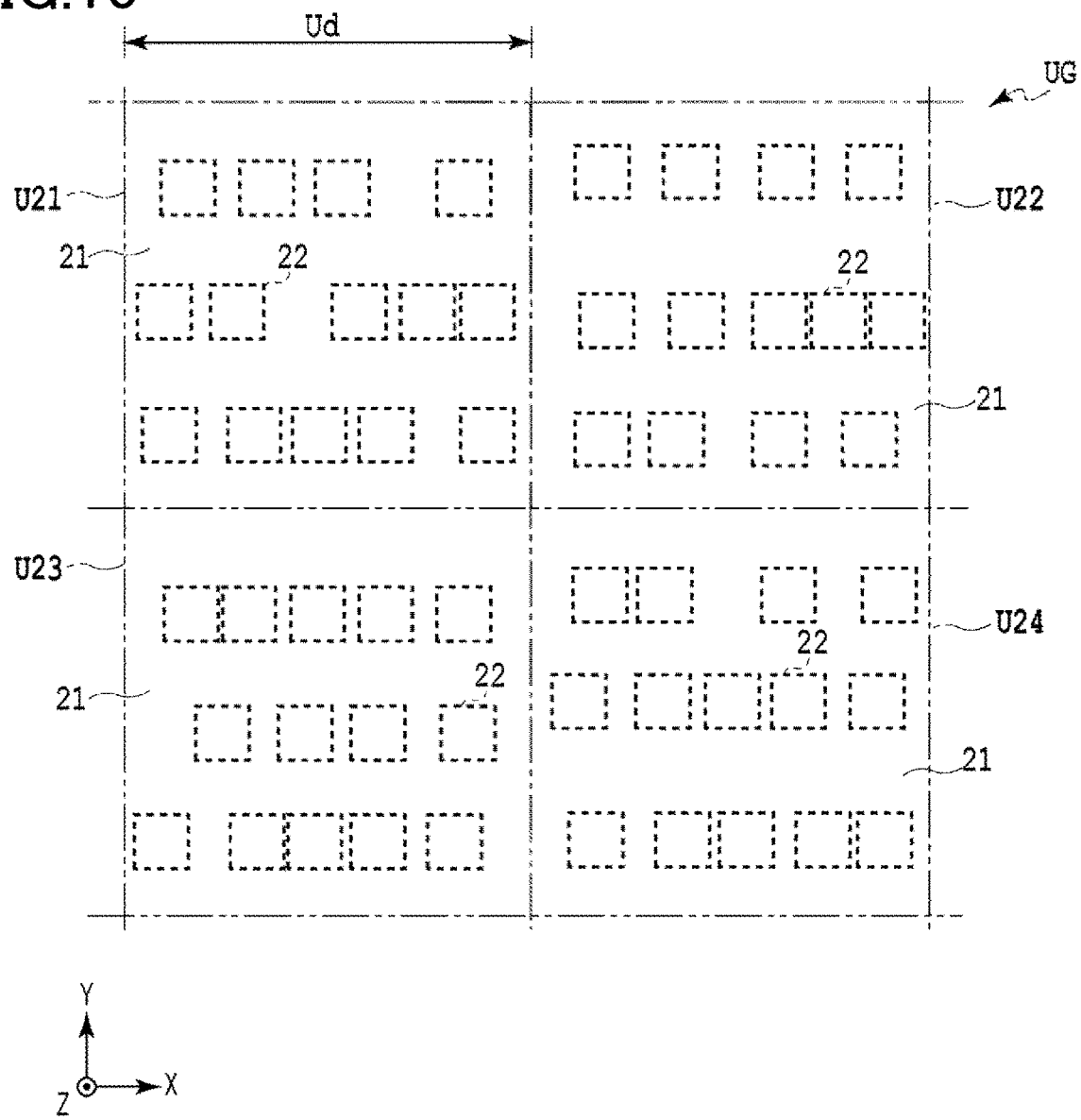
FIG. 10 is a schematic plan view illustrating another example of a concavo-convex structure in a unit group.

FIG. 10 is a plan view of another example of a concavo-convex structure of a unit group UG. In FIG. 10, the unit group UG is made up of directional units U21-U24 in each of which a plurality of convexities 22 are arrayed in a specific direction. Specifically, the unit group UG is made up of units U21-U24 each having convexities 22 of respective square upper surfaces whose sides are oriented in either the X or Y direction. Such a configuration can control the scattering directions of light all over the unit group UG, and can change hues of the unit group between when observed in the direction of arraying the convexities 22 and when observed in the direction perpendicular to the arrayed direction.

Figure 11:
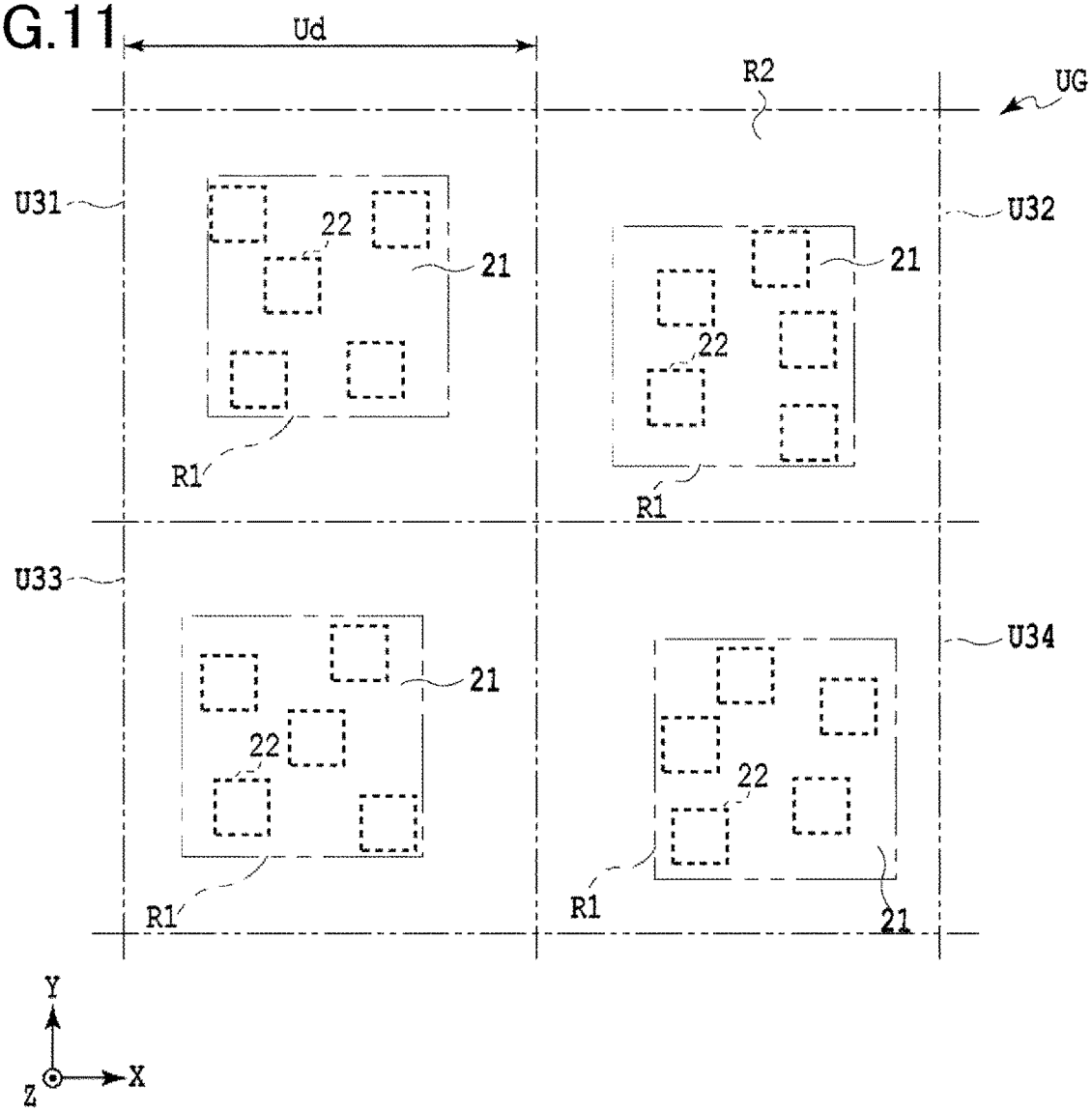
FIG. 11 is a schematic plan view illustrating another example of a concavo-convex structure in a unit group.

FIG. 11 is a plan view of an example of a concavo-convex structure of a unit group UG which is made up of an array of units each including a concavo-convex structure forming part R1 and a concavo-convex structure non-forming part R2 shown in FIG. 8. In the example shown in FIG. 11, the concavo-convex structure forming part R1 is differently positioned between units U31 to U34. The convexities 22 are differently arranged in the concavo-convex structure forming part R1 between the units U31 to U34. In the present invention, the convexities 22 are only required to be arranged differently between the units. Accordingly, in the example shown in FIG. 11, the position of the concavo-convex structure forming part R1 may be the same between the units U31 to U34.

Figure 12:
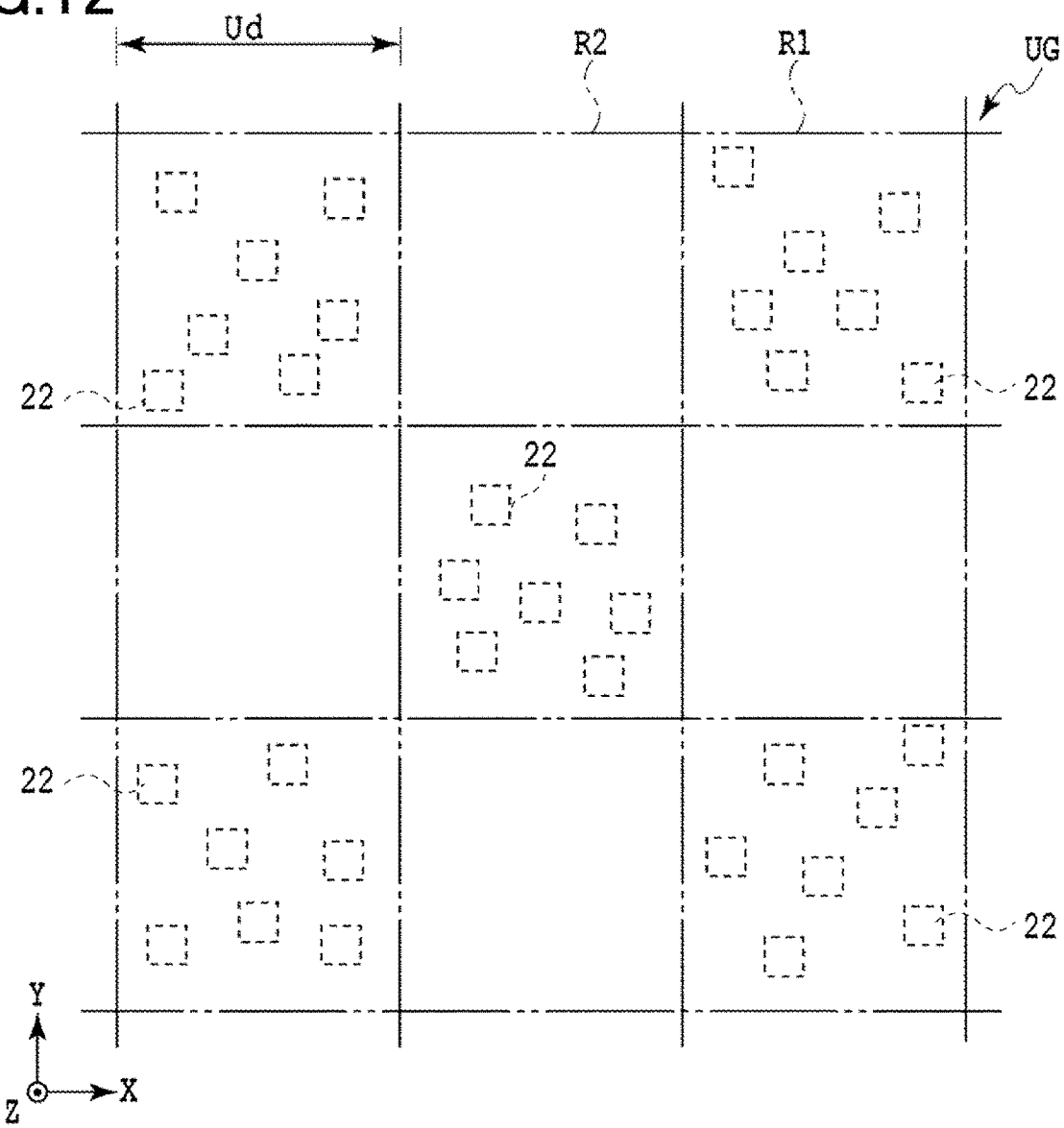
FIG. 12 is a schematic plan view illustrating another example of a concavo-convex structure in a unit group.

FIG. 12 is a plan view illustrating an example of a concavo-convex structure of a unit group UG that includes units each constituted only by a concavo-convex structure non-forming part R2 that does not include a concavo-convex structure forming part R1. In this example, the concavo-convex structure forming part R1 and the concavo-convex structure non-forming part R2 are alternately arrayed as units, but the array is not limited to this. For example, the concavo-convex structure forming part R1 and the concavo-convex structure non-forming part R2 may be randomly arranged.

Figure 13:
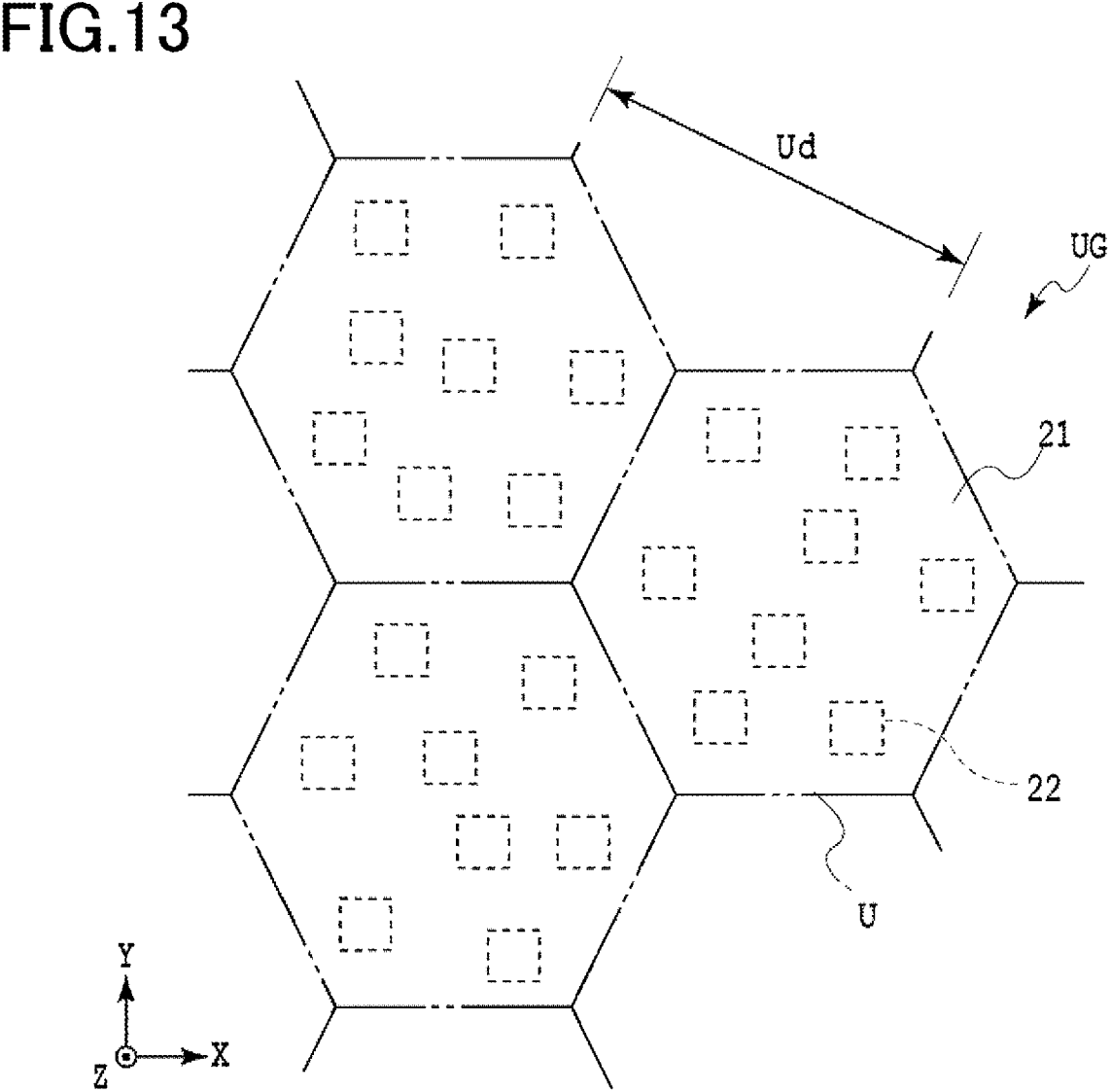
FIG. 13 is a schematic plan view illustrating another example of a concavo-convex structure in a unit group.

The unit U, which has been described as being rectangular in plan view in the foregoing description, may be hexagonal as shown in FIG. 13.

The unit U may be in any shape such as a square, rectangle, diamond, hexagon, or trapezoid, as long as an array can be formed with the shape. However, a square or a rectangle is preferable in terms of ease of manufacture.

The unit shape refers to a shape formed by virtual lines that are provided for defining the unit U.

The accompanying drawings use dash-dot-dot lines to clarify the outline of the unit U and to clarify the boundary between the concavo-convex structure forming part R1 and the concavo-convex structure non-forming part R2, but these lines do not exist in reality.

The number of units constituting the unit group UG is not limited to the numbers shown in FIGS. 9 to 13, but may be determined as appropriate.

The description has so far been given of a concavo-convex structure of a unit group UG that is made up of units whose concavo-convex structures are different from each other. The description hereinafter will be given of an embodiment in which units having an identical concavo-convex structure are included in a unit group UG.

The optical element according to the present invention is characterized in that the element causes no chromatic change that would be caused by a periodic structure, under parallel light such as sunlight or fluorescent light, or under a point light source such as LED light. It is therefore crucial for the concavo-convex structure of the unit group UG not to have a periodic structure.

In the foregoing concavo-convex structure of the unit group UG, the units therein have only concavo-convex structures that are different from each other, and there are no convexities 22 arrayed at a constant pitch. This is because the center-to-center distances of adjacent convexities 22 are not constant in the units constituting the unit group UG, and because the convexities 22 are arranged differently between the units.

If units having an identical concavo-convex structure are included in the unit group UG, there may be convexities 22 happen to be arrayed at a constant pitch.

Figure 14A:
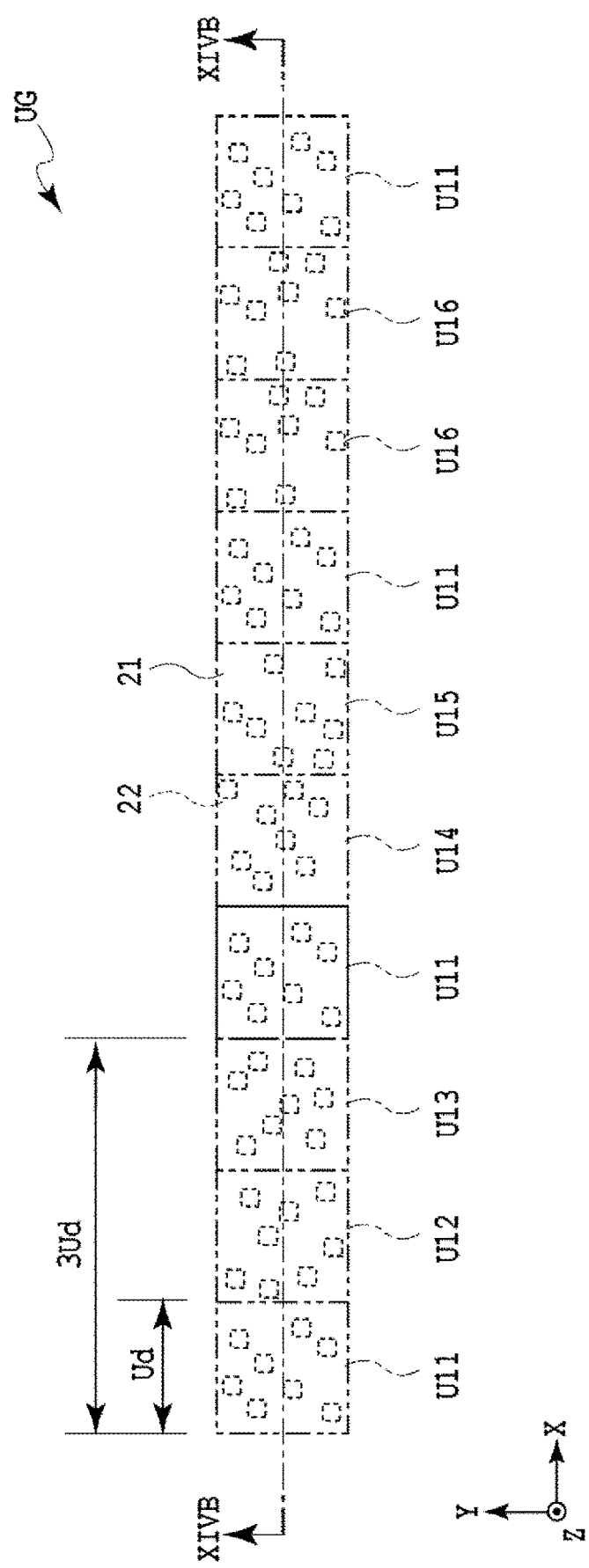
FIG. 14A is a schematic plan view illustrating an example of a unit group in which units having an identical concavo-convex structure are included.

FIG. 14A is a schematic plan view illustrating an example of a unit group UG in which units having an identical concavo-convex structure are included. The unit group UG is made up of square units U11 to U16 each having sides with a length Ud. As shown in FIG. 14A, units U11 are arranged in the unit group UG at a 3Ud pitch in the X direction. In other words, the individual convexities 22 in the units U11 are arrayed at a 3Ud pitch in the X direction.

To visually recognize a chromatic change attributed to a periodic structure under parallel light such as sunlight or fluorescent light, or under a point light source such as LED light, the convexities 22 are required to be arrayed at a pitch of less than 150 μm. Therefore, to prevent chromatic change attributed to the periodic structure in the example shown in FIG. 14A, the arraying pitch 3Ud of the convexities 22 of the units U11 is required to be not less than 150 μm. When the periodic structure is visually observed under laser light, the arraying pitch of the convexities 22 is required to be not less than 300 μm. The reason why the arraying pitch of the convexities 22 is required to be less than 300 μm when using laser light as a light source is that chromatic change attributed to the periodic structure is easily visually observed when compared to using ordinary collimated light or a light source In the example shown in FIG. 14A, the units are arrayed only in the X direction, but they are normally arrayed in all directions. Accordingly, the arraying pitch of the convexities 22 being not less than 150 μm (not less than 300 μm under laser light) applies not only to the X direction but also to the Y direction and any other in-plane directions.

In FIG. 14A, two units 16 are adjacently arrayed as units constituting the unit group UG. In this case, the units 16 may be taken to be arrayed in the X direction at a 1Ud pitch. In the present invention, in the case where a unit group includes a plurality of units having an identical concavo-convex structure, it is only when specific units (units 16) are arrayed at a regular interval over a distance of at least 500 μm, that these units (units 16) are taken to be arrayed at a constant pitch. In other words, even when a plurality of units having an identical concavo-convex structure in the unit group are not arrayed at an interval of less than 150 μm, if the array has a size (length) of less than 500 μm, this is taken to be the situation where "in the concavo-convex structure of the unit group UG, units having an identical concavo-convex structure are not arrayed at a pitch of less than 150 μm". This is because, in the case where a plurality of units having an identical concavo-convex structure are arrayed, if the array has a length of less than 500 μm, the chromatic change attributed to the periodic structure cannot normally be visually recognized. In the example shown in FIG. 14A, if the 1Ud pitch is less than 150 μm, the arrayed units 16 will have a size of less than 500 μm (more specifically, the size formed by the units 16 is less than 300 μm). This corresponds to the situation where "in the concavo-convex structure of the unit group UG, units having an identical concavo-convex structure are not arrayed at a pitch of less than 150 μm".

As described above, the situation where "in the concavo-convex structure of the unit group UG, units having an identical concavo-convex structure are not arrayed at a pitch of less than 150 μm" includes the situation where units having an identical concavo-convex structure are arrayed at a pitch of less than 150 μm but the size (length) of the array is less than 500 μm.

The situation where "in the concavo-convex structure of the unit group UG, units having an identical concavo-convex structure are not arrayed at a pitch of less than 150 μm" can also be specified using an autocorrelation coefficient. The autocorrelation coefficient can be derived from the following autocorrelation function AC(x).

The autocorrelation function AC(x) can be expressed by the following Formula (1), when functions P(x') and p(x') respectively express a concavo-convex cross-section and an arbitrary part of the concavo-convex cross-section, the concavo-convex cross-section being taken along an arbitrary line segment in the plane of the concavo-convex structure of the unit group UG:

$$\text{Autocorrelation coefficient } AC(x) = \int_{-\infty}^{\infty} P(x')p(x'+x)dx' \quad (1)$$

where x is a distance between the functions P(x') and p(x') in a cutting direction with an arbitrary line segment. The concavo-convex cross-section and an arbitrary part thereof can be expressed with functions using a calculated concavo-convex cross-section profile. For example, the concavo-convex cross-section profile is calculated based on the information derived from photomicrographs of these concavo-convex cross-sections taken by a scanning electron microscope (SEM), an atomic force microscope (AFM), or the like.

Based on the autocorrelation function AC(x), an autocorrelation coefficient is derived from the following Formula (2):

$$\text{Autocorrelation coefficient} = \frac{AC(x)}{\int_{-\infty}^{\infty} P(x')^2} \quad (2)$$

Figure 15:
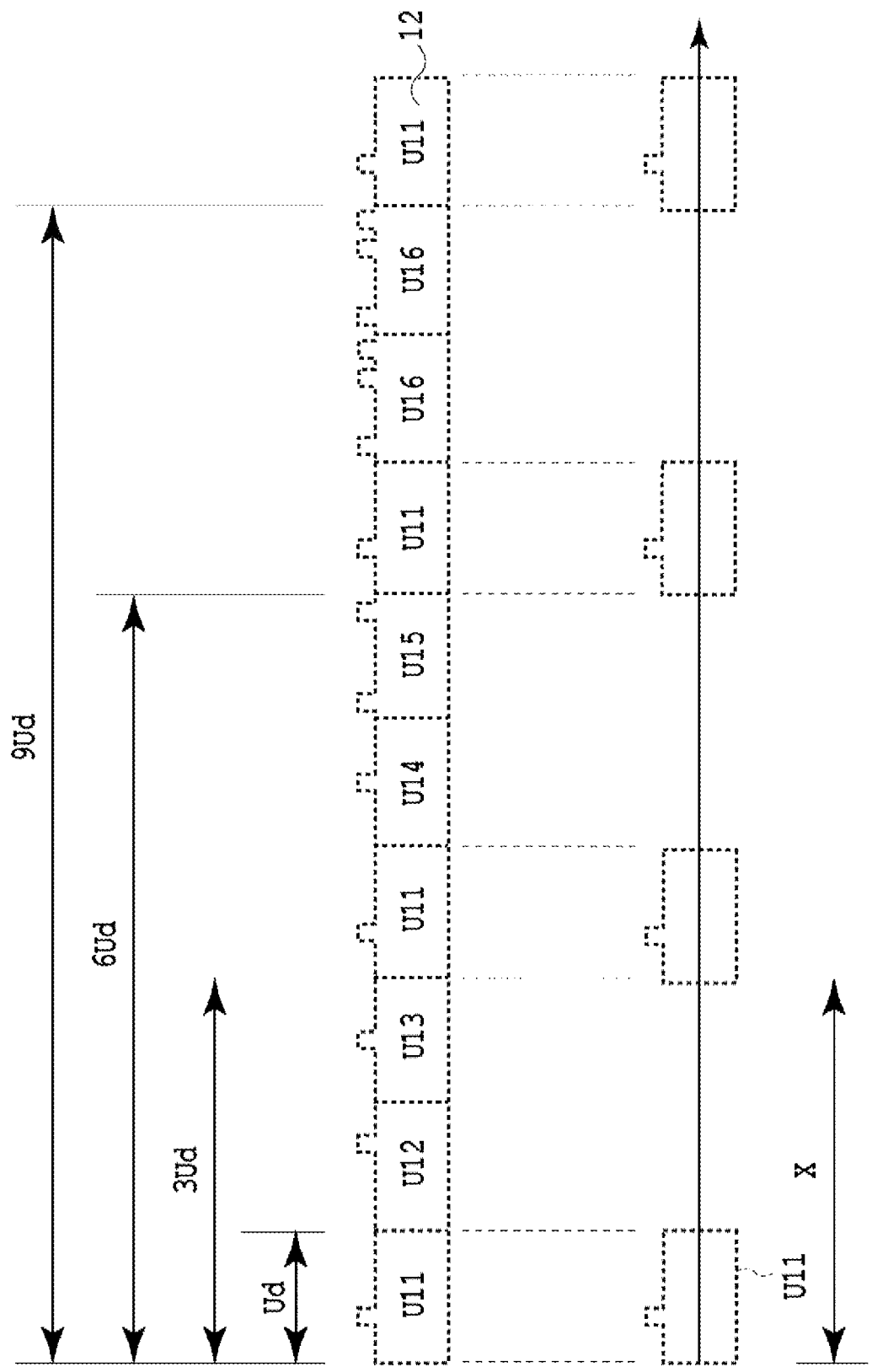
FIG. 15 is a diagram illustrating an autocorrelation function.

If "in the concavo-convex structure of the unit group UG, units having an identical concavo-convex structure are not arrayed at a pitch of less than 150 μm", the autocorrelation coefficient will not be 1 at a pitch of less than 150 μm. The expression "the autocorrelation coefficient will not be 1 at a pitch of less than 150 μm" includes the case where the autocorrelation coefficient is 1 at a pitch of less than 150 μm but the size of the array having that pitch is less than 500 μm. Referring to FIGS. 14B and 15, the autocorrelation coefficient will be more specifically described.

FIG. 14B is a cross-sectional view taken along the line XIVB-XIVB of FIG. 14A. In the cross-sectional view, only the concavo-convex structure forming layer 12 is shown for simplification.

In the present example, the line XIVB-XIVB of FIG. 14A for providing the concavo-convex cross-section of FIG. 14B corresponds to the "arbitrary line segment in the plane" in the description of the autocorrelation function set forth above. Also, the concavo-convex cross-section shown in FIG. 14B is "the concavo-convex cross-section taken along an arbitrary line segment in the plane". Further, the "an arbitrary part of the concavo-convex cross-section" set forth above is a part arbitrarily selected from the concavo-convex cross-section shown in FIG. 14B. For example, "an arbitrary part of the concavo-convex cross-section" may be the concavo-convex cross-section corresponding to the unit U11 located at the left end of the concavo-convex cross-section shown in FIG. 14B. The autocorrelation function AC(x) can be expressed by the following Formula (1) when the functions P(x') and p(x') respectively express the concavo-convex cross-section of FIG. 14B and an arbitrary part thereof (e.g., the concavo-convex cross-section part corresponding to the leftmost unit U11):

$$\text{Autocorrelation coefficient } AC(x) = \int_{-\infty}^{\infty} P(x')p(x'+x)dx' \quad (1)$$

As can be understood from Formula (1), the autocorrelation function AC(x) is yielded by integrating a product of functions P(x') and P(x'+x), over the range of $-\infty$ to $\infty$, the latter function being p(x') shifted by x. The integral interval, which is taken to be in the range of $-\infty$ to $\infty$ in Formula (1), substantially corresponds to the size (length) of the concavo-convex cross-section in the cutting direction along the arbitrary line segment.

When "an arbitrary part of the concavo-convex cross-section" is taken to be the concavo-convex cross-section of the leftmost unit U11 of FIG. 14B, the distance x between the functions P(x') and p(x') in the cutting direction along the arbitrary line segment corresponds to the distance from the left end, when the unit U11 is moved from the left end to the right end as shown in FIG. 15. FIG. 15 is a schematic diagram illustrating a state where the leftmost unit U11 has been moved, relative to the concavo-convex cross-section shown in FIG. 14B. In the present example, x varies from 0 to 9Ud.

Based on the autocorrelation function AC(x) yielded as described above, an autocorrelation coefficient can be derived from the following Formula (2):

$$\text{Autocorrelation coefficient} = \frac{AC(x)}{\int_{-\infty}^{\infty} P(x')^2} \quad (2)$$

If the derived autocorrelation coefficient is 1, the two functions P(x') and p(x') agree with each other. To explain simply, referring to FIG. 15, when the unit U11 is at positions X=0, 3Ud, 6UD and 9UD, the two functions P(x') and p(x') agree with each other and the autocorrelation coefficient takes a value of 1 at a 3Ud pitch. To satisfy the condition that "in the concavo-convex structure of the unit group UG, units having an identical concavo-convex structure are not arrayed at a pitch of less than 150 μm", the pitch 3Ud of the autocorrelation coefficient should be not less than 150 μm, or, although the pitch 3Ud of the autocorrelation coefficient is less than 150 μm, the size (length 10Ud from the leftmost unit 11 to the rightmost unit 11) of the array having that pitch should be less than 500 μm.

In the present description, "an arbitrary part of the concavo-convex cross-section" is taken to be the concavo-convex cross-section part of the unit U11, which is the leftmost unit of FIG. 14B. However, in terms of confirming the presence of the 150-μm pitch, "an arbitrary part of the concavo-convex cross-section" is preferably "an arbitrarily selected 150-μm length of the concavo-convex cross-section taken along an arbitrary line segment in a plane". Also, in terms of more accurately determining the pitch of the convexities 22, "an arbitrary part of the concavo-convex cross-section" even more preferably has "a length that is ten times the length of an average length of arbitrarily selected convexities or concavities of the concavo-convex cross-section taken along an arbitrary line segment in the plane". An excessively small average length of the convexities 22 entails difficulty in determining the pitch that yields the autocorrelation coefficient value of 1.

In an embodiment in which units having an identical concavo-convex structure are included in the unit group UG, the number of units having different concavo-convex structures constituting the unit group UG is not particularly limited, but may preferably be three or more, more preferably five or more, and even more preferably ten or more. A unit group UG in which units having an identical concavo-convex structure are included can reduce the number of unit types, compared to a unit group made up of only units having different concavo-convex structures. This can reduce the number of processes for producing units.

The concavo-convex structure provided in the concavo-convex structure forming layer as described above is formed by arraying units having different concavo-convex structures under a predetermined condition. In conventional optical elements, the concavo-convex structure is not formed by the method of arraying units, and therefore can impose a large load on computers and other systems at the time of determining the arrangement of the numerous convexities 22. In this regard, the optical element of the present invention is provided with a concavo-convex structure that can reduce data generation load, more than the conventional optical elements.

In an embodiment where units having an identical concavo-convex structure are included, use of a dithering method or other randomizing methods can provide an arrangement that satisfies the conditions mentioned above.

In addition, units having an identical concavo-convex structure are preferably not consecutively arrayed over a 0.5-mm or more distance. This is because an array of units having an identical concavo-convex structure over a 0.5-mm or more distance tends to cause diffracted light attributed to the unit pitch, regardless of the unit size.

In the example shown in FIG. 1A, the optical element 10 displays pattern forming parts 20 of characters T, O, and P. Each pattern forming part 20 is constituted by a unit group UG where a plurality of units U are arrayed, as shown in FIG. 1B. The outline of each pattern forming part 20 does not have to be in conformity with the unit shape, but can be expressed by the concavo-convex structure forming parts R1 and concavo-convex structure non-forming parts R2.

The region other than the pattern forming parts 20 typically has a flat structure. Instead, however, such a region may be provided in parallel with various structures such as a diffraction grating structure, a hologram structure, a cross-grating structure, and a lens structure, as stated above.

In the present invention, the concavo-convex structure may be formed by providing a different unit group UG, for each section of a character or design to be displayed. For example, a unit group UG including the convexities 22 (or concavities) with a height (depth) that is different from other sections may be provided, for each section of a character or design to be displayed.

Furthermore, for each section of a character or design to be displayed, a unit group U having directivity of a concavo-convex structure may be combined with a unit group U having no such directivity, and a plurality of units U having different uneven-structure directivities may be combined with each other.

Two or more of these unit groups U may be combined as an exemplification of these combinations.

(Visual Effects of Optical Element)

In the optical element 10 of the present invention, the concavo-convex structure forming layer 12 has a concavo-convex structure having convexities 22 or concavities whose height or depth is constant with reference to the surface of the flat portion. With this configuration, the optical element 10 of the present invention displays a color (structural color) of high chroma level.

The following description addresses the principle of developing such a structural color.

Figure 16:
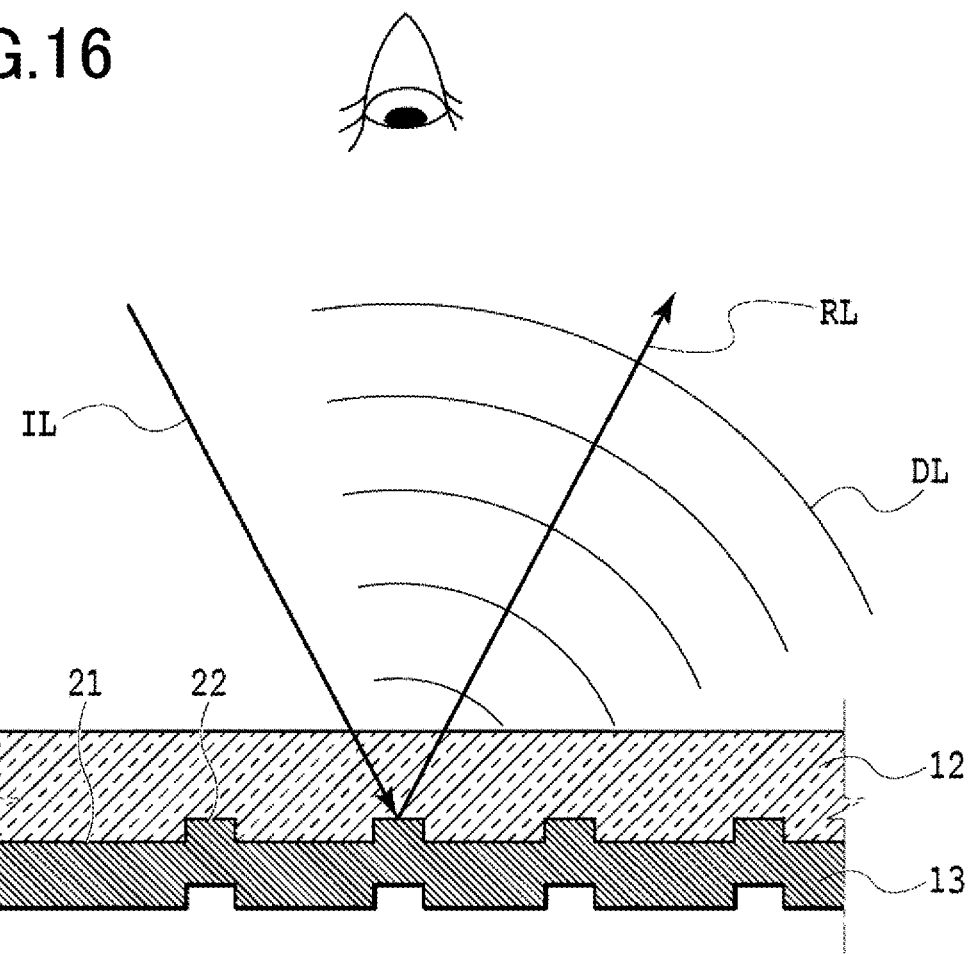
FIG. 16 is a conceptual diagram illustrating optical effects of the present invention.

FIG. 16 is a schematic diagram illustrating how the optical element of the present invention emits scattered light. In the example shown in FIG. 16, the concavo-convex structure has a flat portion 21 and convexities 22 (or concavities), which are arranged so that the center-to-center distances between adjacent convexities and concavities are not constant. When illumination light is incident on such a concavo-convex structure having irregular arrangement, diffracted light is emitted in various directions, in addition to the emission of regular reflection light. Accordingly, a slight change in observation direction does not result in great variation in observed color. Thus, the observer can perceive the structural color according to convexity height or concavity depth.

Figure 17:
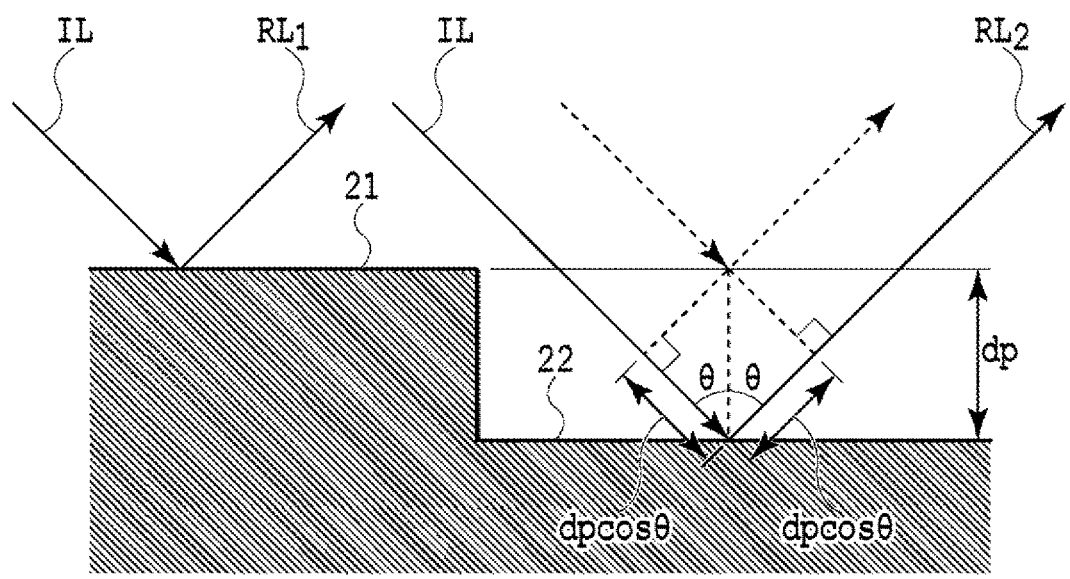
FIG. 17 is another conceptual diagram illustrating optical effects of the present invention.

FIG. 17 is a schematic diagram illustrating how illumination light enters from an optically transparent substrate 11 side into a concavo-convex structure of the concavo-convex structure forming layer 12 and is reflected on the upper surface of the concavity 22 and the flat portion 21 in the optical element 10.

As shown in FIG. 17, when illumination light IL enters the concavo-convex structure at an angle $\theta$, there is an optical path difference between light RL2 that is reflected on the upper surface of the concavity 22, and light RL1 that is reflected on the flat portion 21. The optical path difference is expressed by a formula: $2ndp \cos\theta$. As indicated in the formula, the optical path difference is twice as large as a product of a height dp of the convexity 21 with reference to the surface of the flat portion 21, $\cos\theta$, and a refraction index n of the concavo-convex structure forming layer 12.

Therefore, a phase difference between the light RL1 and the light RL2 will be the optical path difference multiplied by $2\pi/\lambda$. Accordingly, the phase difference will be $4\pi n dp \cos\theta/\lambda$.

If the phase difference is an integer multiple of $2\pi$, the light RL1 and light RL2 create constructive interference. If the phase difference is equal to a sum of $\pi$ and $2\pi$ that is multiplied by an integer, the light RL1 and light RL2 create destructive interference.

If the convexity height or the concavity depth is constant as in the unit group UG of the present invention, diffraction efficiency is sufficiently small in part of the region of the visible wavelength range compared to the rest of the region.

As described above, the observer perceives specific a structural color according to the convexity height or concavity depth when illumination light is applied to the concavo-convex structure of the optical element of the present invention.

For example, let us assume a situation of observing a unit group UG having convexities of a specific height. Let us further assume that, in this situation, diffraction efficiency of blue light (wavelength: 460 nm) becomes low, and wavelength components of the diffracted light reaching the observer's eyes are red (wavelength: 630 nm) and green (wavelength: 540 nm). In this situation, the observed color is yellow. Also, let us assume a situation of observing a unit group UG having concavities of another height. Let us further assume that, in this situation, diffraction efficiency of red light becomes low, and wavelength components of the diffracted light reaching the observer's eyes are green and blue. In this situation, the observed color is cyan.

In the example shown in FIG. 1A, a constant height (or depth) may be applied to the concavities 22 (concavities) of all the characters T, O and P. In this case, all the characters can be displayed with a single structural color. Alternatively, the height (or depth) of the concavities 22 (concavities) may be made different between the characters T, O and P. In this case, these characters are displayed with different structural colors. Alternatively, each character may have convexities (concavities) part of which has a height (depth) that is different from the rest of the character. In this case, even more diverse colors can be displayed.

As described above, the optical element of the present invention has a structure that is capable of reducing data generation load, and displays colors having little observation-angle-dependent chromatic change and at a higher chroma level.

(Method of Producing Optical Element)

Description is now given of a method of producing the optical element 10 of the present invention by way of an example.

First, a concavo-convex structure forming layer 12 is formed in which a concavo-convex structure is formed on one surface.

As a template for forming the concavo-convex structure, a metal stamper is prepared through photolithography as follows.

A photosensitive resist material is applied to a smooth substrate (glass substrate is generally used) to form a resist material layer of a uniform thickness. The photosensitive resist material may be a known positive or negative type material. Then, a desired pattern is drawn on the resist material layer by use of a charged particle beam. After that, the resultant resist material layer is developed to obtain a structural body having a desired concavo-convex structure.

Using this structural body as an original template, a metal stamper is prepared through electroforming or the like. Electroforming is a kind of surface treatment for forming a metal film on an object by immersing the object in a given aqueous solution and using the reducing power of electrons by energizing the object.

Use of such a method enables precise duplication of a fine concavo-convex structure provided on a surface of the original plate. The surface of the object to be electroformed needs to be electrically conductive. However, since photosensitive resists are generally non-conductive, a thin metal film is provided in advance on a surface of the structural body by vapor phase deposition, such as sputtering or vacuum deposition, prior to electroforming.

Then, using this stamper, a concavo-convex structure is duplicated. First, a thermoplastic resin or a photocurable resin is applied to an optically transparent substrate 11 which is made of polycarbonate, polyester, or the like. Then, the metal stamper is brought into close contact with the coating film, followed by application of heat and pressure or irradiation of light. Then, the metal stamper is removed from the resin layer to produce a concavo-convex structure forming layer 12 having a concavo-convex structure.

In the foregoing description, use of photolithography is mentioned as a method of producing an original plate. However, other methods, such as a cutting method or an etching method, may be used for the processing of the surface of the metal or the like. Such a method enables direct processing of the surface of the metal plate, and thus enables direct preparation of a metal stamper, eliminating the necessity of using electroforming or other methods.

Then, a metal such as aluminum, or a dielectric material is deposited on the concavo-convex structure forming layer 12 by vapor deposition, for example, for formation into a single layer or a multilayer, thereby forming a light-reflecting layer 13. For example, when only part of the concavo-convex structure forming layer 12 is to be covered with the light-reflecting layer 13, the light-reflecting layer 13 is formed as a continuous film by vapor-phase deposition, and then part thereof is removed such as by a chemical. The optical element 10 is fabricated with the method as described above.

<Optical Element-Equipped Article>

The optical element 10 of the present invention described above can be used as an anticounterfeit label or the like by being supported by a printed matter or other articles. As described above, optical elements can provide visual effects, at relatively low cost, which have not been achieved by conventional art, so that they can exert higher anticounterfeit effects for a wide variety of articles.

Figure 18:
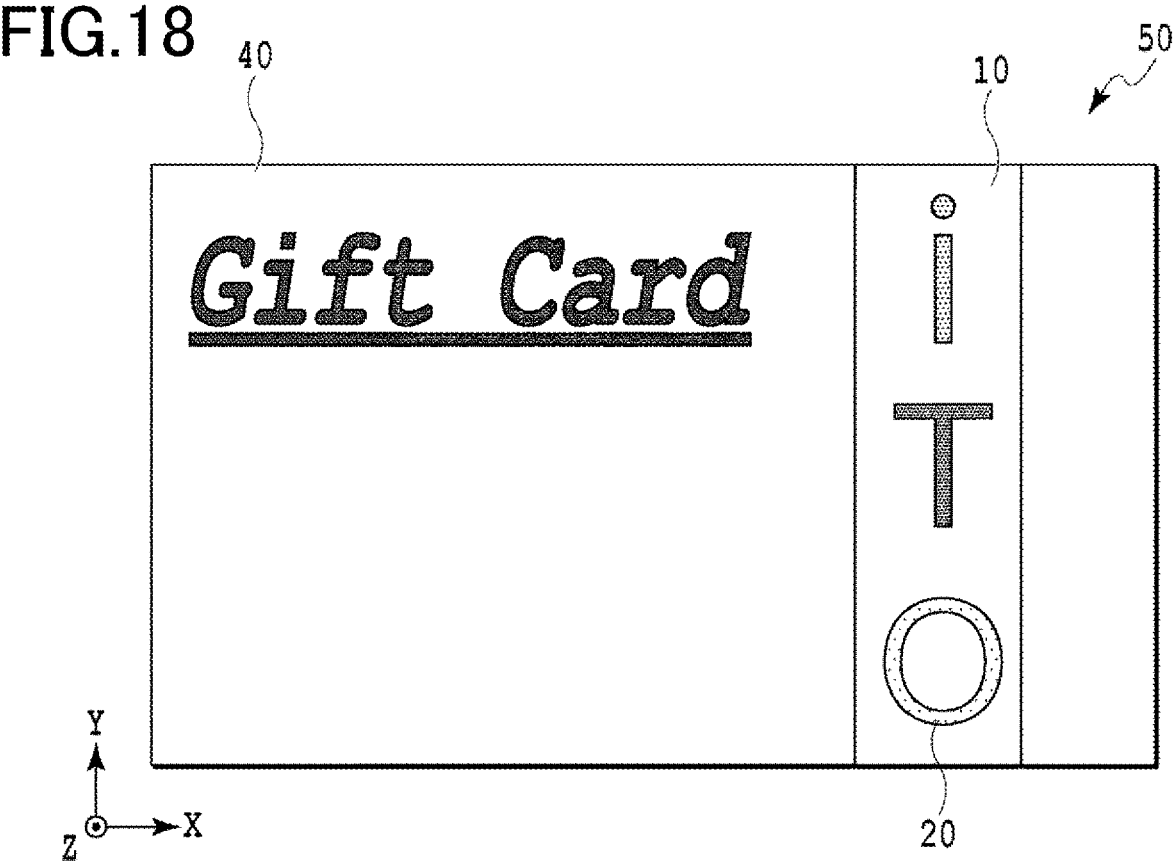
FIG. 18 is a plan view illustrating an example of an optical element-equipped article according to the present invention.

FIG. 18 is a schematic plan view illustrating an example of an article with the optical element of the present invention.

Examples of an article 40 to which the optical element 10 is attached include cards such as magnetic cards, IC cards, ID cards, passports, valuable papers such as gift certificates, and tags or labels attached to articles that should be proved to be genuine. The article 40 may be a package or part thereof housing an article that should be proved to be genuine.

In an optical element-equipped article 50, the optical element 10 may be secured to a base material of the article 40 with an adhesive. For example, the optical element 10 may be prepared in advance as an adhesive sticker, a transfer foil, or a hologram sheet, and affixed to a base material. The transfer foil may be in a stripe or patch shape, and may be applied to the overall surface or part of the surface of the article 40.

If the article 40 has a printed layer or the like on the base material thereof, the optical element 10 may be secured to the printed layer of the base material. The optical element-equipped article 50 can make the optical effects of the optical element 10 more prominent, when the optical effects of the former are compared with those of the optical element 10 provided to the printed layer.

In the case of securing the optical element 10 to a base material, and if the base material is paper, the paper may be made with an addition of the optical element 10 thereto while an opening is formed at the position corresponding to the location of the optical element. The optical element 10 may be embedded in the article 40. In this case, the optical element 10 can serve as a thread.

The optical element 10 may be used for purposes other than counterfeit prevention. For example, the optical element 10 may be used for toys, learning materials, and accessories.

EXAMPLES

The present invention will be more specifically described by way of examples. However, the present invention should not be limited to these examples.

<Fabrication of Optical Element>

Example 1

The optical element of the present invention was fabricated as follows.

First, an ultraviolet curing resin was applied to a polyethylene terephthalate film (termed PET film hereinafter) having a thickness of 80 μm so that the applied resin will have a uniform thickness.

Then, this coating film was irradiated with ultraviolet light from a PET film side while a nickel stamper provided with a predetermined concavo-convex structure was pressed against the coating film, thereby curing the ultraviolet curing resin.

Then, the nickel stamper was removed to obtain a concavo-convex structure forming layer having a desired concavo-convex structure on one surface. The nickel stamper provided with the concavo-convex structure was formed by drawing a pattern, by means of an electron beam lithography apparatus, on a layer to which a photo resist had been applied with a uniform thickness, followed by development and electroforming.

Then, aluminum was uniformly deposited, by vacuum deposition, on the uneven surface of the concavo-convex structure forming layer to form a light-reflecting layer, thereby fabricating an optical element.

Figure 19:
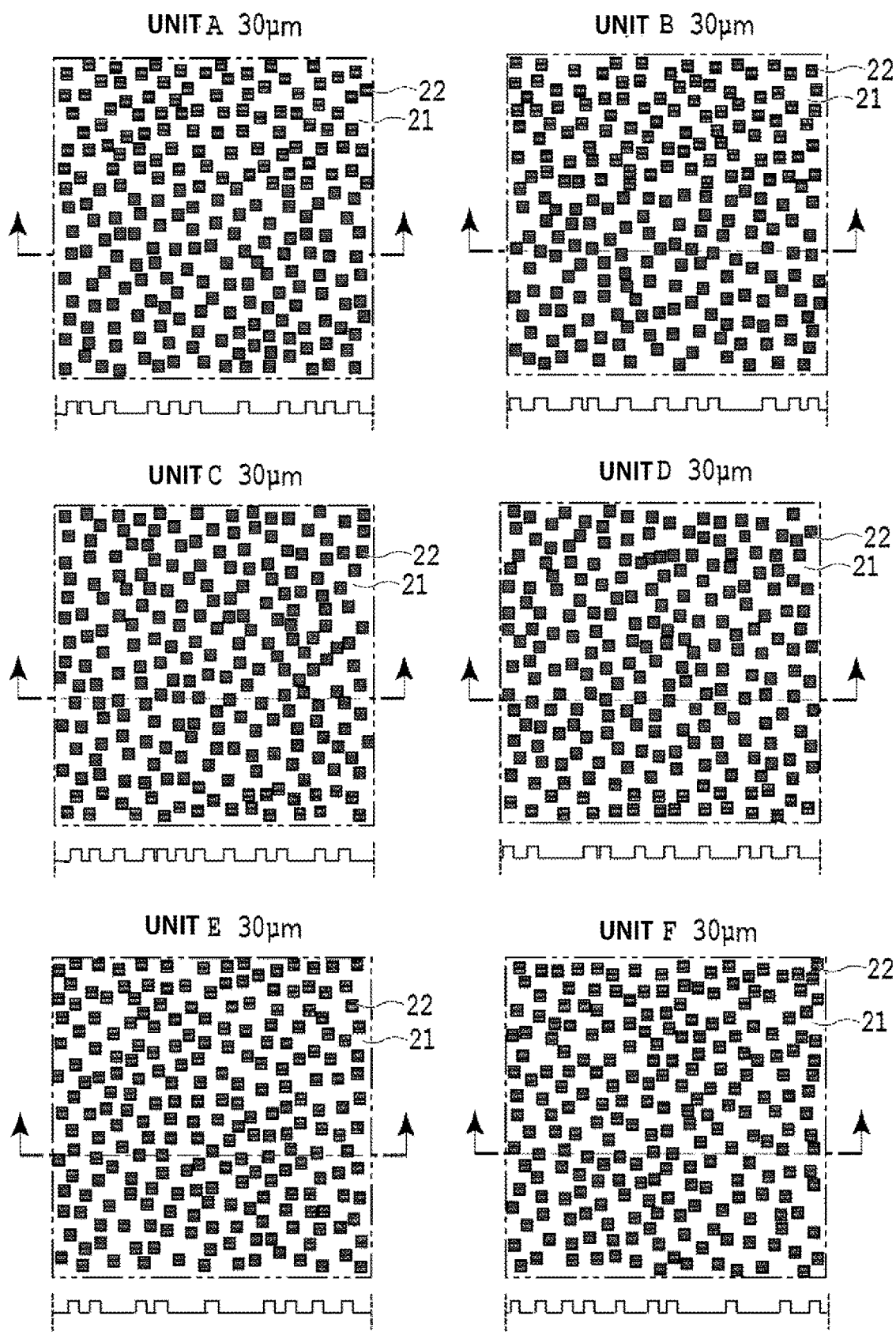
FIG. 19 is a set of schematic diagrams respectively illustrating concavo-convex structures of units A-F.

The concavo-convex structure forming layer produced as described above included a unit group where six units A to F were arrayed in the order of ABCDEFADBECFDCA-BEFDAFDBECBAFCE as a region for a concavo-convex structure provided on one surface thereof. As shown in FIG. 19, the units A to F each had a square outer shape of 30 μm on each side, and had 230 convexities each having a square upper surface of 1 μm on each side. In addition, the upper surfaces of the convexities had an area occupancy of 25.6% in each of the units A to F.

An autocorrelation coefficient was calculated as follows, for the concavo-convex structure provided to the unit group of the concavo-convex structure forming layer. More specifically, a profile of the concavo-convex cross-section was calculated from a micrograph (e.g., SEM) of a cross-section of the element. Using the calculated profile, an autocorrelation function AC(x) was derived from the following Formula (1):

$$\text{Autocorrelation coefficient } AC(x) = \int_{-\infty}^{\infty} P(x')p(x'+x)dx' \quad (1)$$

and an autocorrelation coefficient was calculated by use of the following Formula (2):

$$\text{Autocorrelation coefficient} = \frac{AC(x)}{\int_{-\infty}^{\infty} P(x')^2} \quad (2)$$

where P(x') and p(x') are functions indicating, respectively, a concavo-convex cross-section taken along a line segment in the X direction of the unit group, and a concavo-convex cross-section corresponding to a 10-μm length (ten times the length 1 μm of one side of each convexity) from the left end of the unit group. The "concavo-convex cross-section taken along a line segment in the X direction of the unit group" herein corresponds to the combination of the cross-sections of the units A to F shown in FIG. 19 arrayed in the order (ABCDEFADBECFDCABEFDAFDBECBAFCE) described above. x corresponds to the length from the left end when the concavo-convex cross-section corresponding to the 10-μm length from the left end of the unit group is moved from the left end to the right end. The integration range is 0-900 μm.

Figure 20:
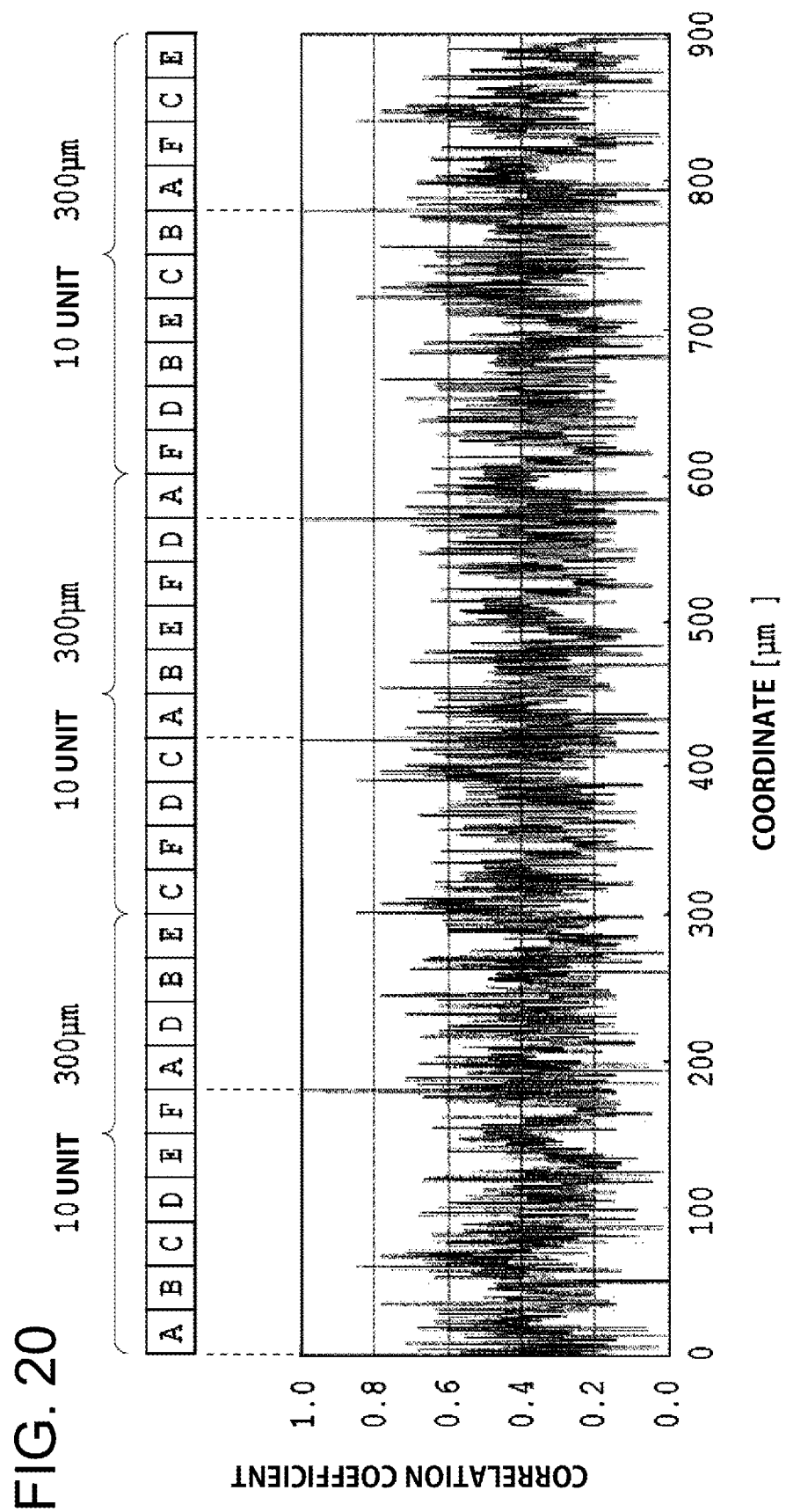
FIG. 20 is a diagram illustrating an autocorrelation coefficient of a concavo-convex structure of a concavo-convex structure forming layer formed in Example 1.

Autocorrelation coefficients calculated in this way are shown in FIG. 20. As shown in FIG. 20, the autocorrelation coefficient takes a value of 1 at positions 0 μm, 180 μm, 420

μm, 570 μm, and 780 μm. It will be understood from this that the autocorrelation coefficient does not take a value of 1 at the pitch of less than 150 μm.

Example 2

An optical element was fabricated in a manner similar to Example 1 in the concavo-convex structure forming layer formed in Example 1, except that a unit group made up of six units A to F arrayed in the order of ABCDEFADBE-ABCDEFADBEABCDEFADBE was used as a unit group included in the region of the concavo-convex structure.

Figure 21:
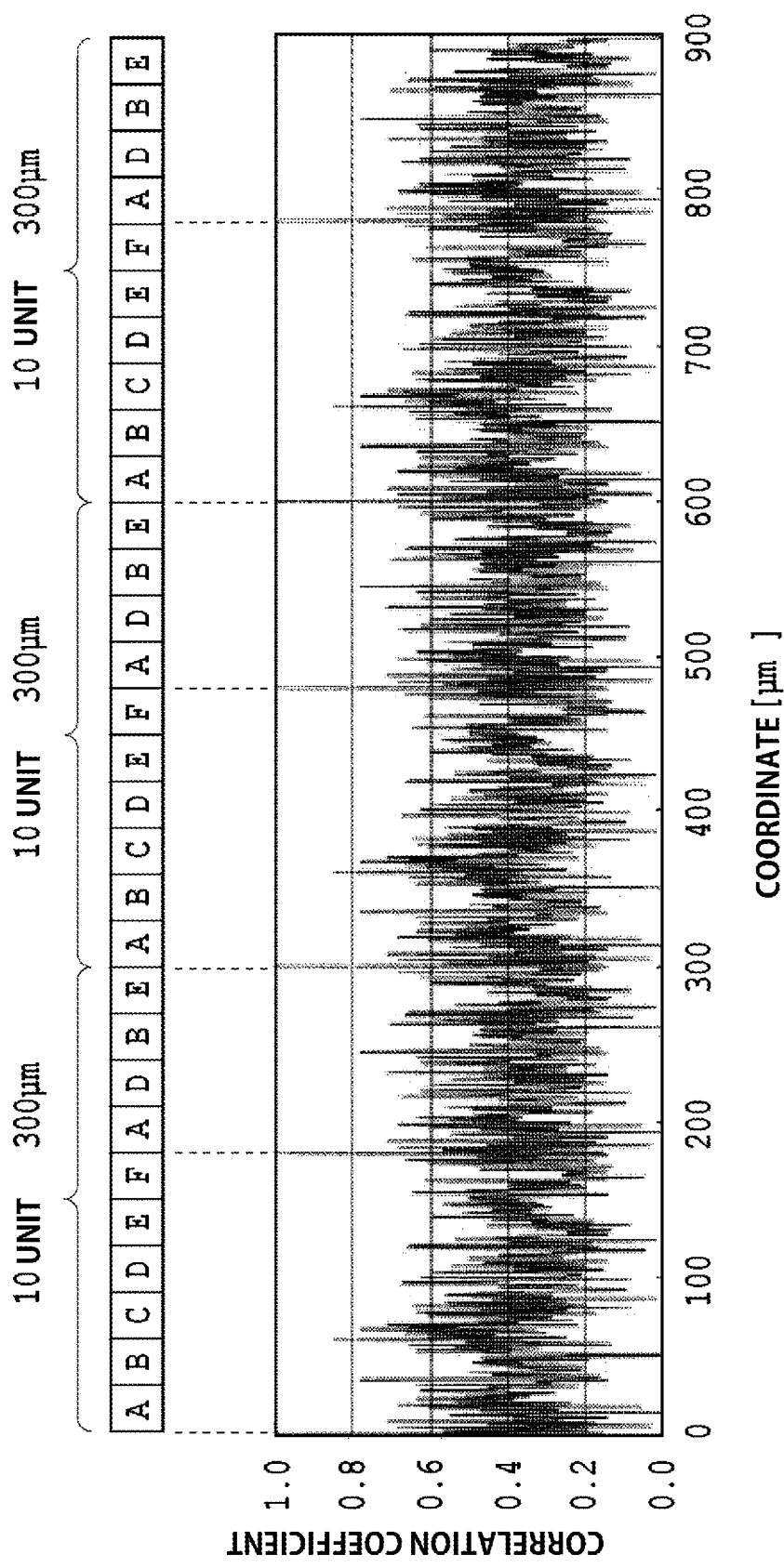
FIG. 21 is a diagram illustrating an autocorrelation coefficient of a concavo-convex structure of a concavo-convex structure forming layer formed in Example 2.

The autocorrelation coefficients calculated for the concavo-convex structure of the unit group are shown in FIG. 21. As shown in FIG. 21, the autocorrelation coefficient takes a value of 1 at positions 0 μm, 180 μm, 300 μm, 480 μm, 600 μm, and 780 μm. It will be understood from this that the autocorrelation coefficient does not take a value of 1 at the pitch of less than 150 μm.

Example 3

An optical element was fabricated in a manner similar to Example 1 in the concavo-convex structure forming layer formed in Example 1, except that a unit group made up of six units A to F arrayed in the order of AACFDEBBE-DEFCDEBFDBACFACCEFABE was used as a unit group included in the region of the concavo-convex structure.

Figure 22:
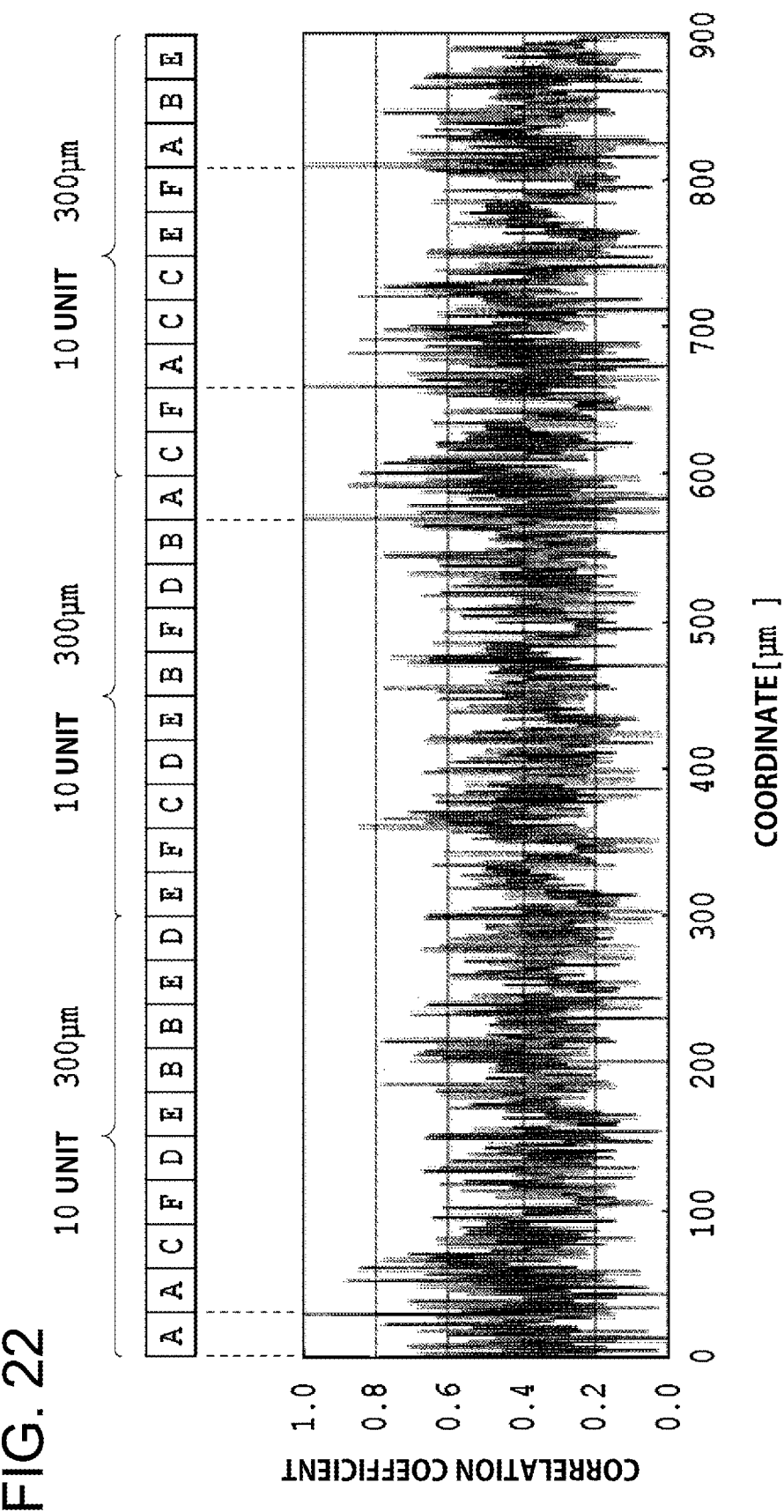
FIG. 22 is a diagram illustrating an autocorrelation coefficient of a concavo-convex structure of a concavo-convex structure forming layer formed in Example 3.

The autocorrelation coefficients calculated for the concavo-convex structure of the unit group are shown in FIG. 22. As shown in FIG. 22, the autocorrelation coefficient takes a value of 1 at positions 0 μm, 30 μm, 570 μm, 660 μm, and 810 μm. It will be understood from this that the autocorrelation coefficient does not take a value of 1 at the pitch of less than 150 μm.

Example 4

An optical element was fabricated in a manner similar to Example 1 in the concavo-convex structure forming layer formed in Example 1, except that a unit group made up of six units A to F arrayed in the order of ACAEBADAFCAE-ABFADAEBAFACDABAED was used as a unit group included in the region of the concavo-convex structure.

Figure 23:
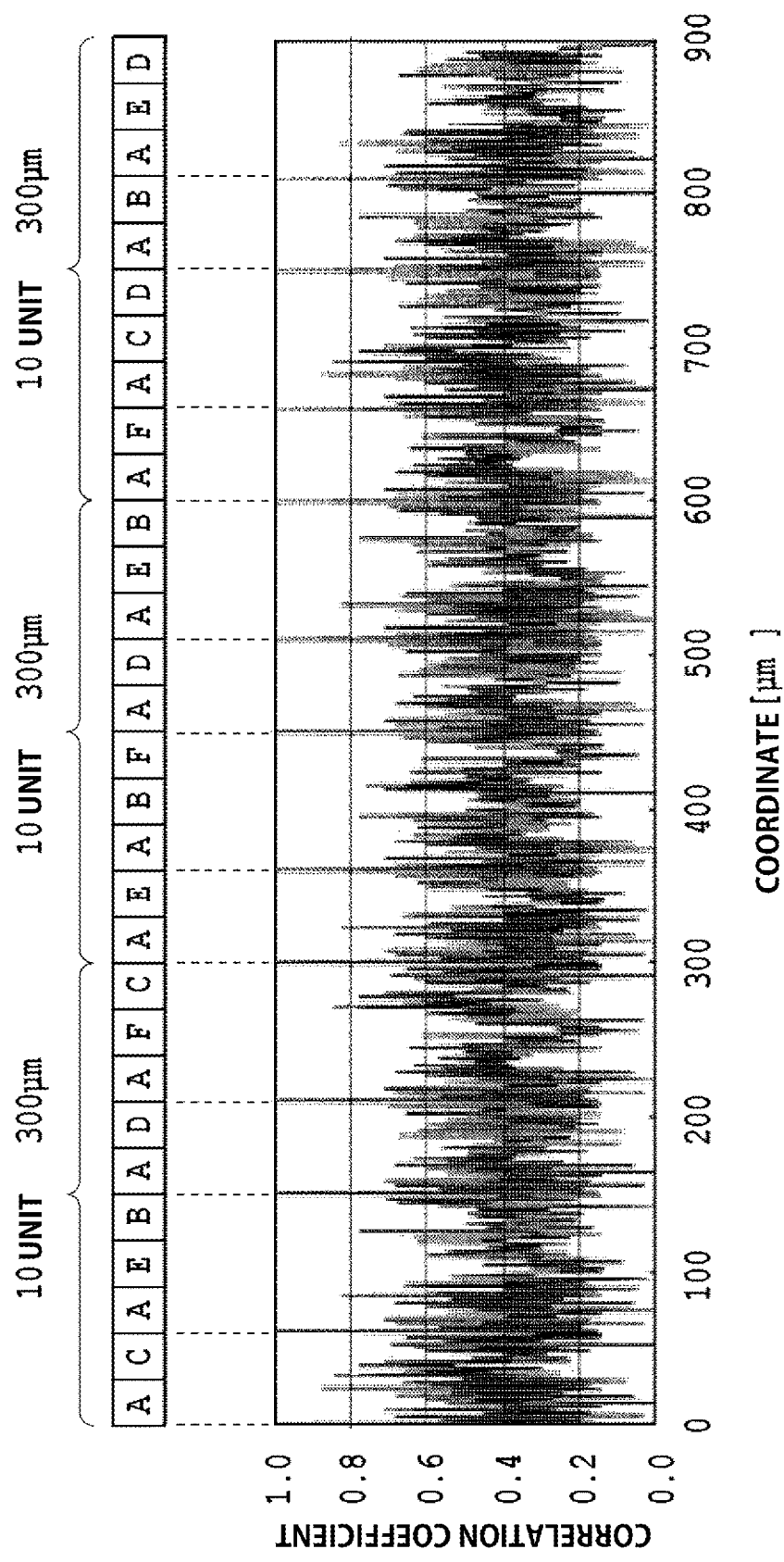
FIG. 23 is a diagram illustrating an autocorrelation coefficient of a concavo-convex structure of a concavo-convex structure forming layer formed in Example 4.

The autocorrelation coefficients calculated for the concavo-convex structure of the unit group are shown in FIG. 23. As shown in FIG. 23, the autocorrelation coefficient takes a value of 1 at positions 0 μm, 60 μm, 150 μm, 210 μm, 300 μm, 360 μm, 450 μm, 510 μm, 600 μm, 660 μm, 750 μm, and 810 μm. When the positions 0 μm, 150 μm, 300 μm, 450 μm, 600 μm, and 750 μm are concerned, it will be understood that the autocorrelation coefficient takes a value of 1 at the pitch of 150 μm. Since the pitch is not less than 150 μm, it will be understood that there is no occurrence of a state where the autocorrelation coefficient takes a value of 1 at the pitch of less than 150 μm.

Comparative Example 1

An optical element was fabricated in a manner similar to Example 1 in the concavo-convex structure forming layer formed in Example 1, except that the unit group made up of six units A to F arrayed in the order of ABCADEAFEAD-BADFAFEACBACDAEFABC was used as a unit group of the region for the concavo-convex structure.

Figure 24:
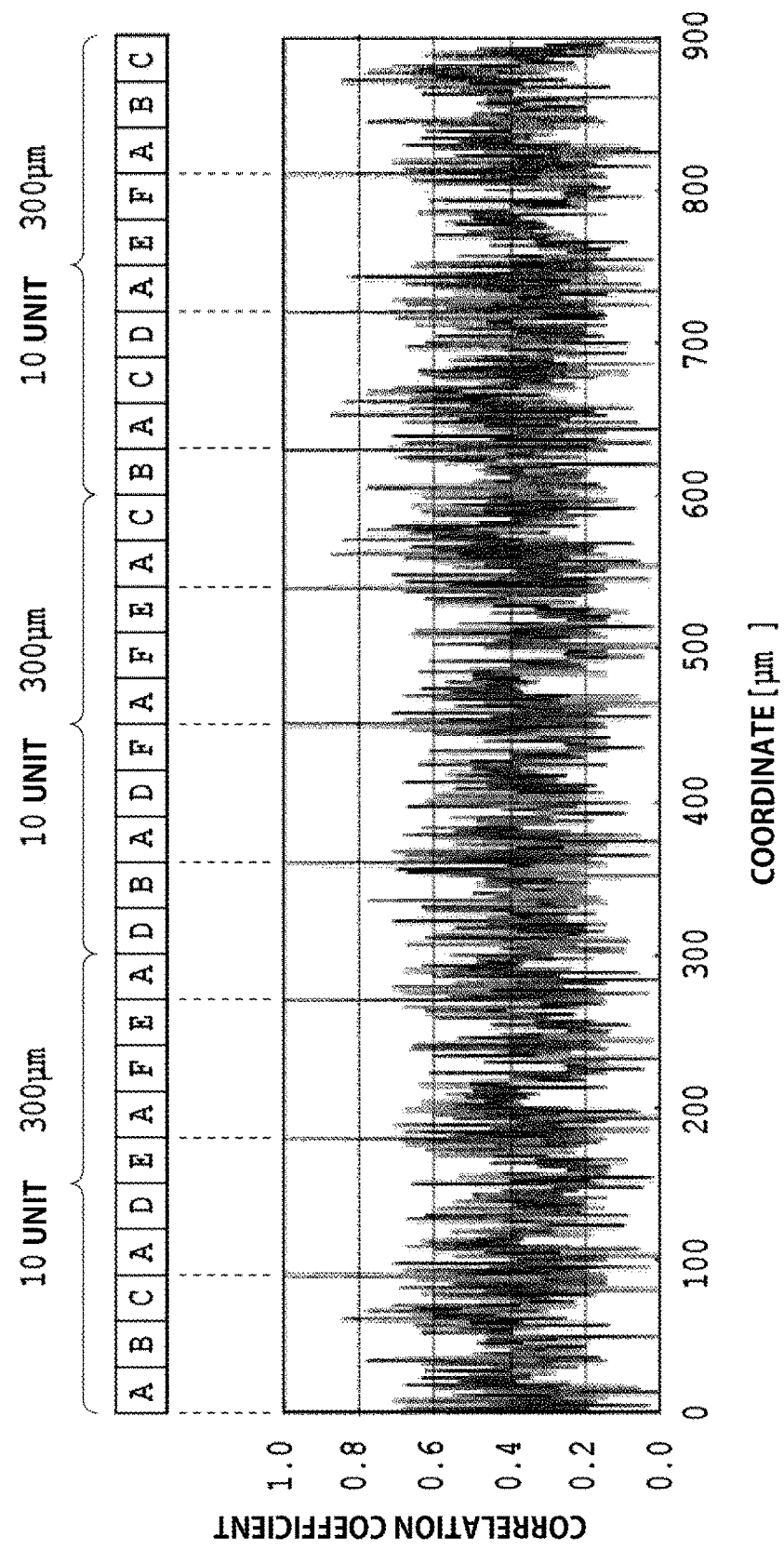
FIG. 24 is a diagram illustrating an autocorrelation coefficient of a concavo-convex structure of a concavo-convex structure forming layer formed in Comparative Example 1.

The autocorrelation coefficients calculated for the concavo-convex structure of the unit group are shown in FIG. 24. As shown in FIG. 24, the autocorrelation coefficient takes a value of 1 at positions 0 μm, 90 μm, 180 μm, 270 μm, 360 μm, 450 μm, 540 μm, 630 μm, 720 μm, and 810 μm. As can be seen from these results, the autocorrelation coefficient takes a value of 1 at the pitch of 90 μm. It will be understood from this that the autocorrelation coefficient for the concavo-convex structure of the unit group takes a value of 1 at the pitch of less than 150 μm.

<Evaluations of the Optical Element>

The optical elements fabricated as described above were visually observed under fluorescent light and LED light to confirm the visual effects.

In all the optical elements of Examples 1 to 4 and Comparative Example 1, colors (structural colors) of high chroma level were observed.

When the optical elements were observed at different angles, chromatic change (iridescent change) was not observed in the optical elements of Examples 1 to 4. In the optical element of Comparative Example 1, chromatic change was not observed under fluorescent light, but observed under LED light.

REFERENCE SIGNS LIST

10 . . . Optical element; 11 . . . Optically transparent substrate; 12 . . . Concavo-convex structure forming layer; 13 . . . Light-reflecting layer; 20 . . . Pattern forming part 21 . . . Flat portion; 22 . . . Convexity (or Concavity); U . . . Unit; UG . . . Unit group; Ud . . . Unit pitch; R1 Concavo-convex structure forming part; R2 . . . Concavo-convex structure non-forming part; 40 . . . Article; 50 . . . Optical element-equipped article.

What is claimed is:

1. An optical element comprising:
   a concavo-convex structure forming layer that has a concavo-convex structure on one surface; and
   a light-reflecting layer that covers at least part of a surface of the concavo-convex structure of the concavo-convex structure forming layer, wherein:
   the concavo-convex structure forming layer comprises a unit group made up of a plurality of units whose concavo-convex structures are different from each other and that includes units having an identical concavo-convex structure;
   each of the units has a flat portion and either a plurality of convexities or a plurality of concavities, with an upper surface of each convexity or a bottom surface of each concavity being substantially parallel to a surface of the flat portion;
   the convexities or the concavities adjacent to each other have center-to-center distances that are not constant;
   the convexities or the concavities have a constant height or depth; and
   in the unit group, the units having an identical concavo-convex structure are not arrayed at a pitch of less than 300 μm.

2. The optical element of claim 1, wherein:
   in a concavo-convex cross-section taken along an arbitrary line segment in a plane of the concavo-convex structure of the unit group, when the concavo-convex cross-section and an arbitrarily selected 150-μm length of the concavo-convex cross-section are respectively indicated by functions P(x') and p(x'), an autocorrelation function AC(x) can be expressed by the following Formula (1):

$$\text{Autocorrelation function } AC(x) = \int_{-\infty}^{\infty} P(x')p(x'+x)dx' \quad (1),$$

where x is a distance between the functions P(x') and p(x') in a cutting direction along an arbitrary line segment; and an autocorrelation coefficient derived from the autocorrelation function AC(x) through the following Formula (2) does not take a value of 1 at a pitch of less than 150 µm;

$$\text{Autocorrelation coefficient} = \frac{AC(x)}{\int_{-\infty}^{\infty} P(x')^2}. \quad (2)$$

3. The optical element of claim 1, wherein:

in a concavo-convex cross-section taken along an arbitrary line segment in a plane of a concavo-convex structure of the unit group, when the concavo-convex cross-section and a length that is ten times the length of an average length of convexities or concavities of the concavo-convex cross-section are respectively indicated by functions P(x') and p(x'), an autocorrelation function AC(x) is expressed by the following Formula (1):

$$\text{Autocorrelation function } AC(x) = \int_{-\infty}^{\infty} P(x')p(x'+x)dx' \quad (1),$$

where x is a distance between the functions P(x') and p(x') in a cutting direction along an arbitrary line segment; and an autocorrelation coefficient derived from the autocorrelation function AC(x) through the following Formula (2) does not take a value of 1 at a pitch of less than 150 µm;

$$\text{Autocorrelation coefficient} = \frac{AC(x)}{\int_{-\infty}^{\infty} P(x')^2}. \quad (2)$$

4. The optical element of claim 1, wherein the concavo-convex structures are different between adjacent units.

5. The optical element of claim 1, wherein the unit group is made up of non-directional units having the plurality of convexities or the plurality of concavities arranged at random, or made up of directional units having the plurality of convexities or the plurality of concavities arranged in a specific direction, or made up of the non-directional units combined with the directional units.

6. The optical element of claim 1, wherein the adjacent convexities or the adjacent concavities have center-to-center distances whose average is in a range of 1.0 µm to 3.0 µm.

7. The optical element of claim 1, wherein a height of the convexities or a depth of the concavities is in a range of 0.05 µm to 0.5 µm.

8. An optical element-equipped article including the optical element of claim 1 and a support for the optical element.

* * * * *